United States Patent
Lee et al.

(10) Patent No.: US 12,167,262 B2
(45) Date of Patent: Dec. 10, 2024

(54) METHOD AND DEVICE FOR PERFORMING RLM IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 362 days.

(21) Appl. No.: 17/602,854

(22) PCT Filed: Apr. 13, 2020

(86) PCT No.: PCT/KR2020/004987
§ 371 (c)(1),
(2) Date: Oct. 12, 2021

(87) PCT Pub. No.: WO2020/209699
PCT Pub. Date: Oct. 15, 2020

(65) Prior Publication Data
US 2022/0167192 A1    May 26, 2022

Related U.S. Application Data

(60) Provisional application No. 62/901,765, filed on Sep. 17, 2019, provisional application No. 62/888,418, (Continued)

(51) Int. Cl.
*H04W 24/08* (2009.01)
*H04W 72/20* (2023.01)

(52) U.S. Cl.
CPC ........... *H04W 24/08* (2013.01); *H04W 72/20* (2023.01)

(58) Field of Classification Search
CPC ....... H04W 4/40; H04W 24/08; H04W 72/20; H04W 72/40; H04W 52/146;
(Continued)

(56) References Cited

U.S. PATENT DOCUMENTS

| | | | |
|---|---|---|---|
| 2018/0160328 A1* | 6/2018 | Chendamarai Kannan | ................. H04B 7/0632 |
| 2019/0052380 A1* | 2/2019 | Cui | ........................ H04W 48/12 |
| 2019/0261244 A1* | 8/2019 | Jung | ................... H04W 36/305 |

(Continued)

FOREIGN PATENT DOCUMENTS

| | | |
|---|---|---|
| WO | 2014-107091 | 7/2014 |
| WO | 2015-119427 | 8/2015 |
| WO | 2017-126266 | 7/2017 |

OTHER PUBLICATIONS

Samsung et al., On Sidelink RLM, R1-1904430, 3GPP TSG RAN WG1 #96bis, Xi'an, China, Apr. 3, 2019, see section 2.
(Continued)

*Primary Examiner* — Kan Yuen
(74) *Attorney, Agent, or Firm* — BRYAN CAVE LEIGHTON PAISNER LLP

(57) ABSTRACT

Provided are a method for a first device to perform wireless communication, and a device supporting same. The method may comprise: a step for receiving, from a second device, a plurality of reference signals or N SCIs through N channels; a step for determining, on the basis of at least one among the sequence of the plurality of reference signals and the N SCIs, the number or ratio of channels that have failed in reception; and a step for performing radio link monitoring (RLM) on the basis of the number or ratio of channels that have failed in reception. N may be a positive integer.

19 Claims, 25 Drawing Sheets

Related U.S. Application Data filed on Aug. 16, 2019, provisional application No. 62/843,339, filed on May 3, 2019, provisional application No. 62/842,509, filed on May 2, 2019, provisional application No. 62/841,810, filed on May 1, 2019, provisional application No. 62/833,607, filed on Apr. 12, 2019.

(58) Field of Classification Search
CPC ...... H04W 52/20; H04B 17/17; H04L 1/0003; H04L 1/0009; H04L 1/0026; H04L 1/1685; H04L 1/1822; H04L 1/1896; H04L 5/0023; H04L 5/0033; H04L 5/0044; H04L 5/0048; H04L 5/0053; H04L 5/0091; H04L 27/261
See application file for complete search history.

(56) References Cited

U.S. PATENT DOCUMENTS

| | | | |
|---|---|---|---|
| 2019/0364554 A1* | 11/2019 | Kuang | H04W 72/0453 |
| 2020/0107236 A1* | 4/2020 | Tseng | H04W 4/40 |
| 2021/0321277 A1* | 10/2021 | Murray | H04W 56/001 |
| 2022/0022085 A1* | 1/2022 | Ji | H04L 5/0053 |
| 2022/0053513 A1* | 2/2022 | Ryu | H04W 72/1263 |
| 2022/0110076 A1* | 4/2022 | Shimoda | H04W 36/08 |
| 2022/0150730 A1* | 5/2022 | Freda | H04W 24/04 |

OTHER PUBLICATIONS

Intel Corporation, Radio link monitoring and radio link failure handling, R2-1701729, 3GPP TSG RAN WG2#97, Athens, Greece, Feb. 4, 2017, see p. 2, and figure 1.

* cited by examiner

FIG. 4
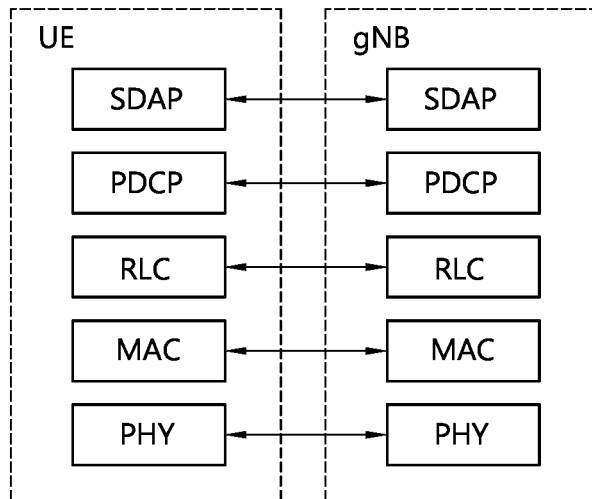
(a)
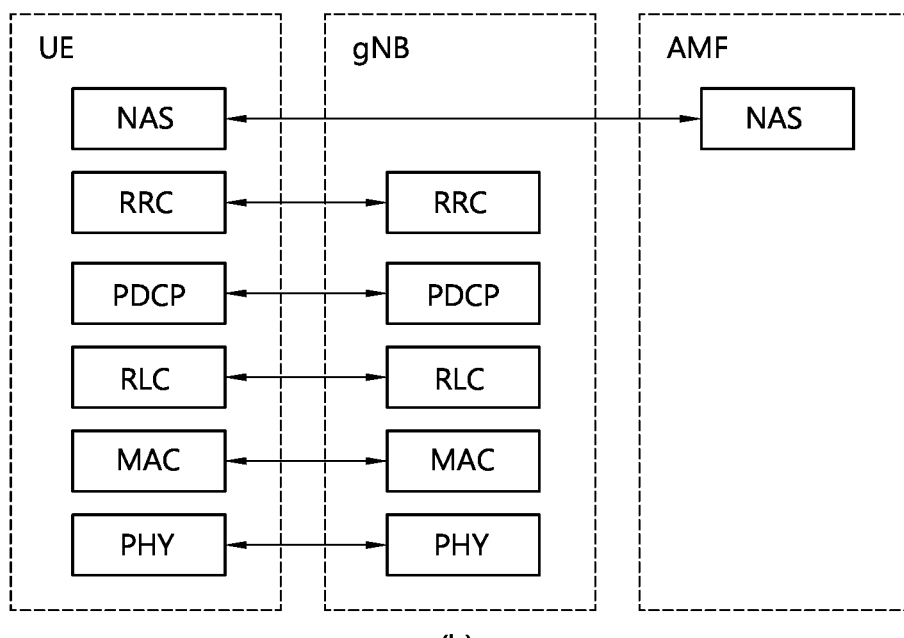
(b)

FIG. 8
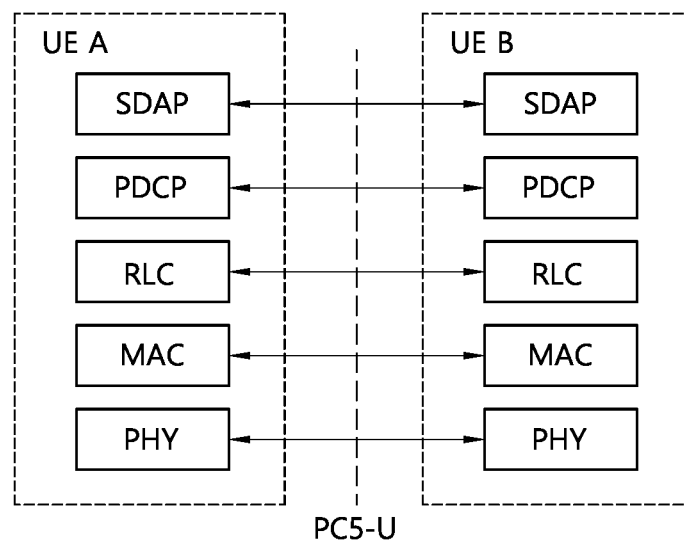
(a)
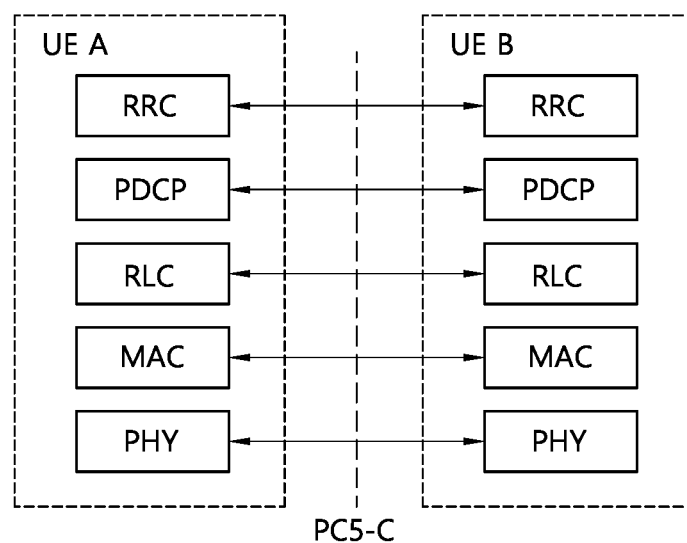
(b)

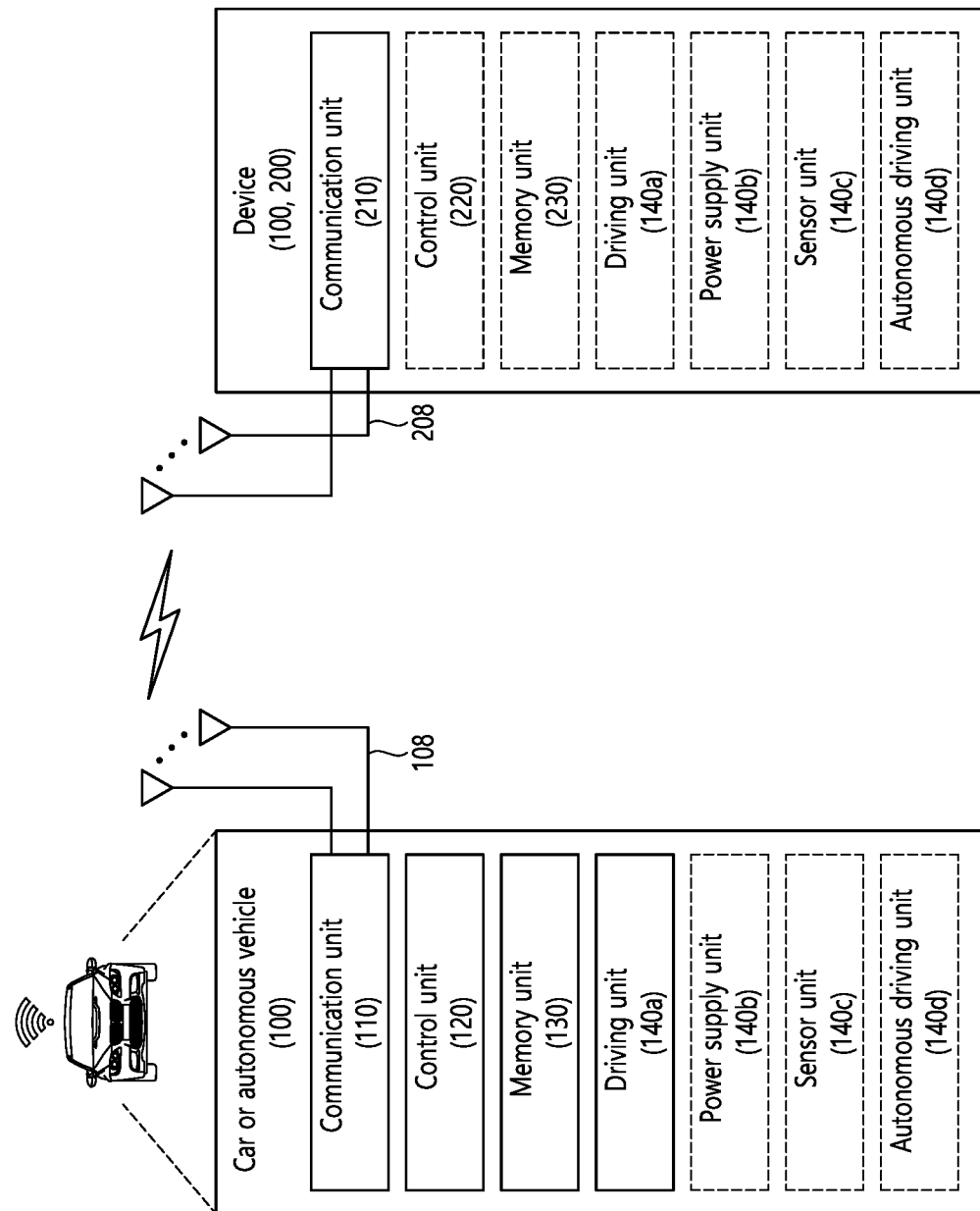

METHOD AND DEVICE FOR PERFORMING RLM IN NR V2X

This application is the National Stage filing under 35 U.S.C. 371 of International Application No. PCT/KR2020/004987 filed on Apr. 13, 2020, which claims priority to U.S. Provisional Application Nos. 62/833,607 filed on Apr. 12, 2019; 62/841,810 filed on May 1, 2019; 62/842,509 filed on May 2, 2019; 62/843,339 filed on May 3, 2019; 62/888,418 filed on Aug. 16, 2019 and 62/901,765 filed on Sep. 17, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in order to efficiently manage/support SL communication between different UEs, for example, in order to efficiently manage/support SL communication based on PC5 RRC connection between different UEs, RLM operation(s) and/or RLF operation(s) of UE(s) needs to be supported.

Technical Solutions

In one embodiment, a method for performing wireless communication by a first device is provided. The method may comprise: receiving, from a second device, a plurality of reference signals or N sidelink control informations (SCIs) through N channels; determining a number of channels or a ratio of channels failed to receive, based on at least one of sequences of the plurality of reference signals or the N SCIs; and performing radio link monitoring (RLM) based on the number of channels or the ratio of channels failed to receive, wherein N is a positive integer.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: receive, from a second device, a plurality of reference signals or N sidelink control informations (SCIs) through N channels; determine a number of channels or a ratio of channels failed to receive, based on at least one of sequences of the plurality of reference signals or the N SCIs; and perform radio link monitoring (RLM) based on the number of channels or the ratio of channels failed to receive, wherein N is a positive integer.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 25 shows a vehicle or an autonomous vehicle, based on an embodiment of the present disclosure.

DESCRIPTION OF EXEMPLARY EMBODIMENTS

Figure 1:
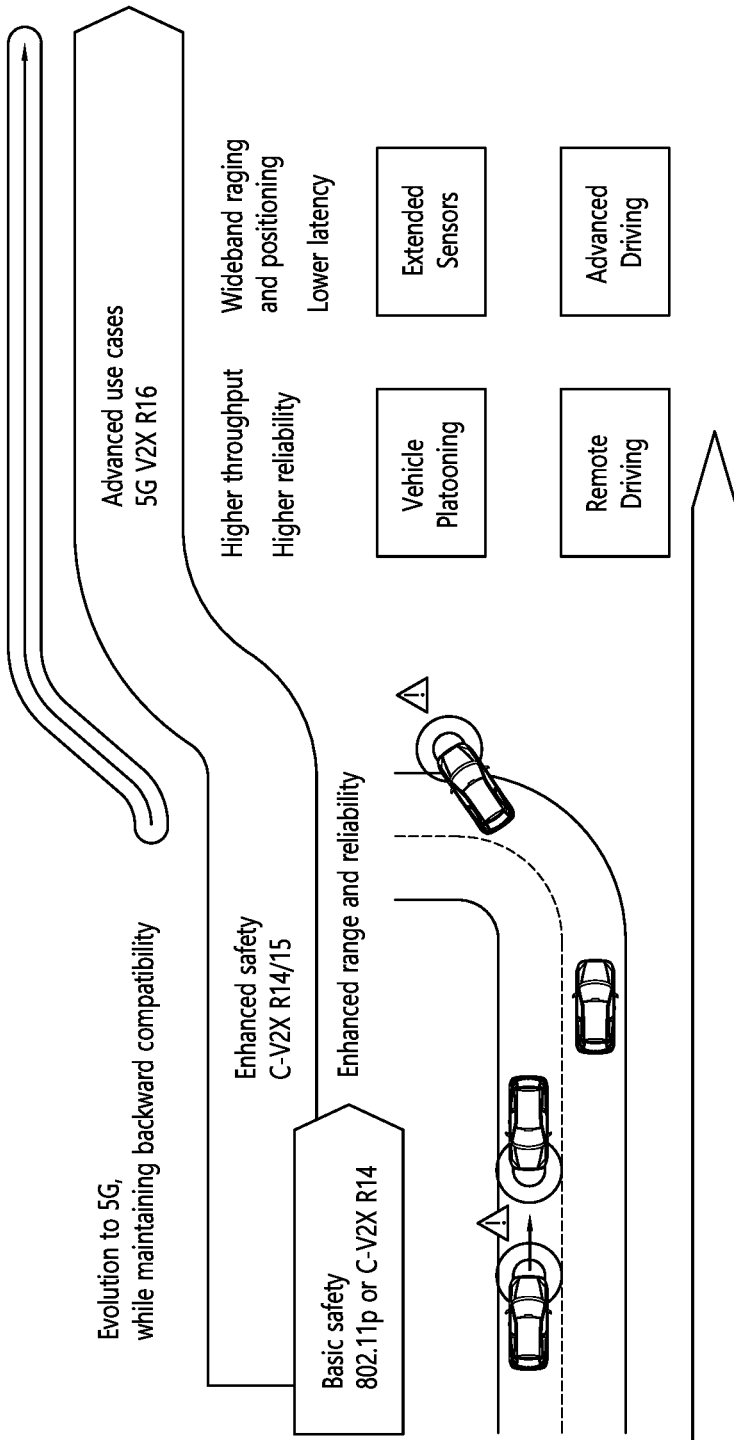
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
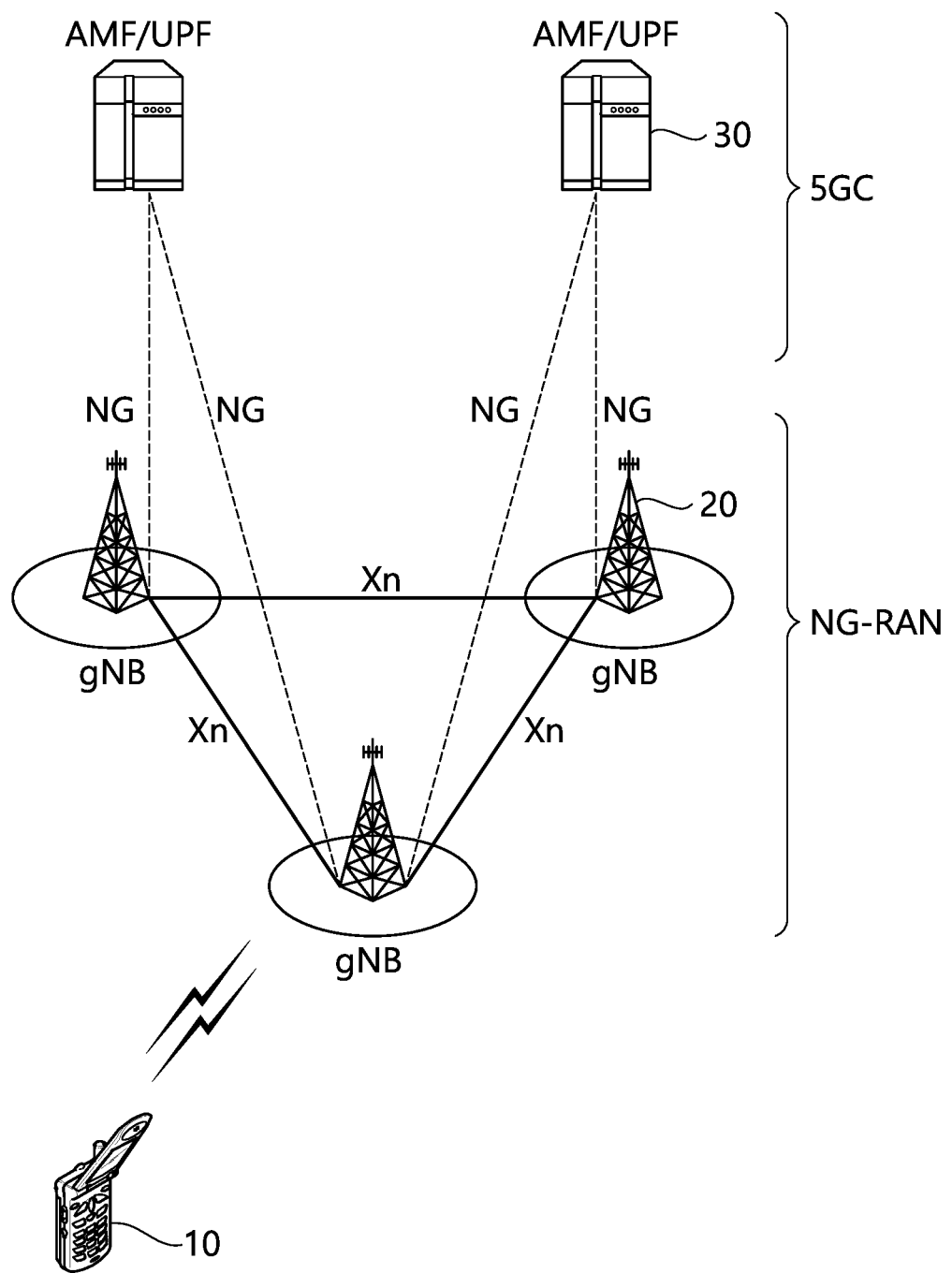
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
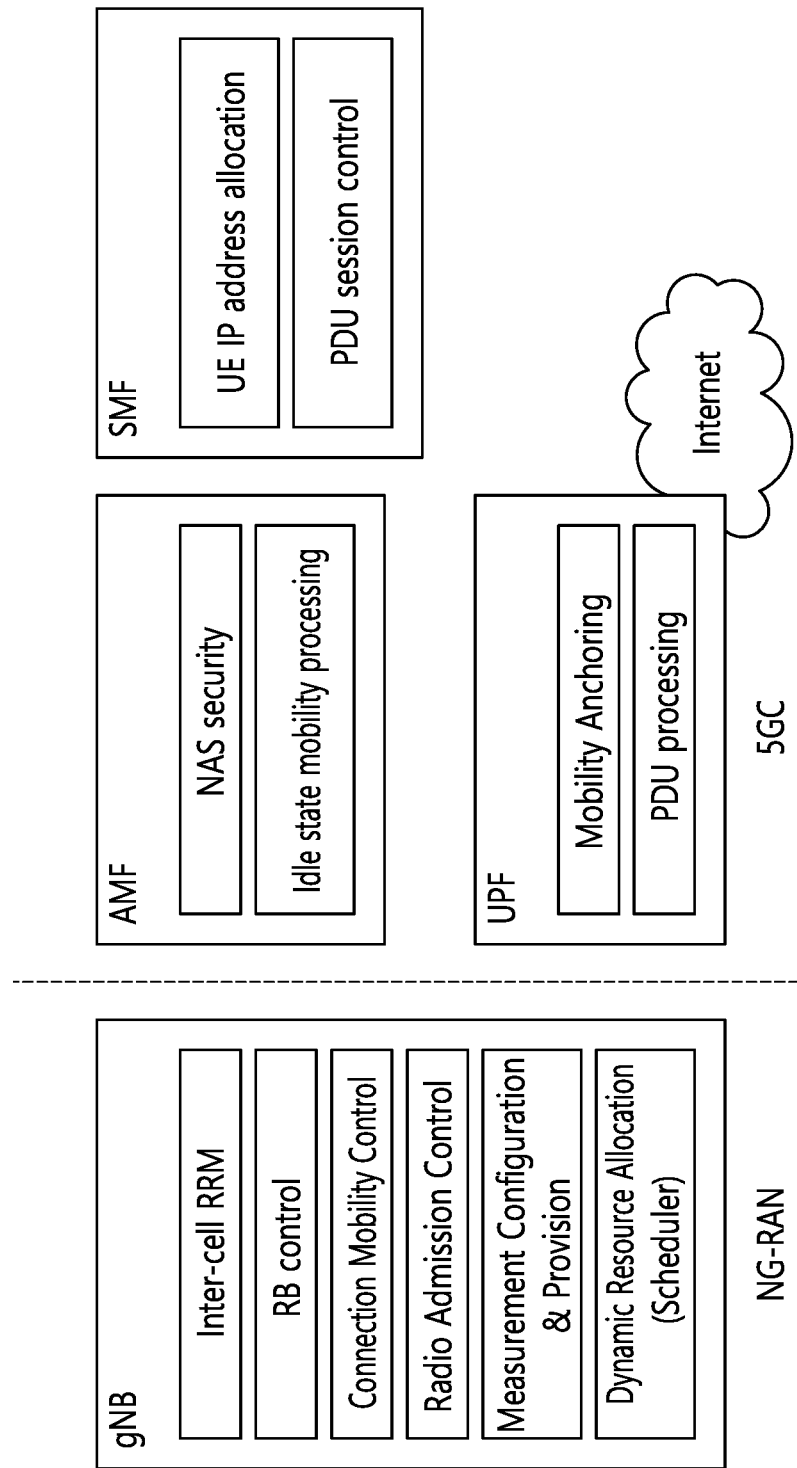
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
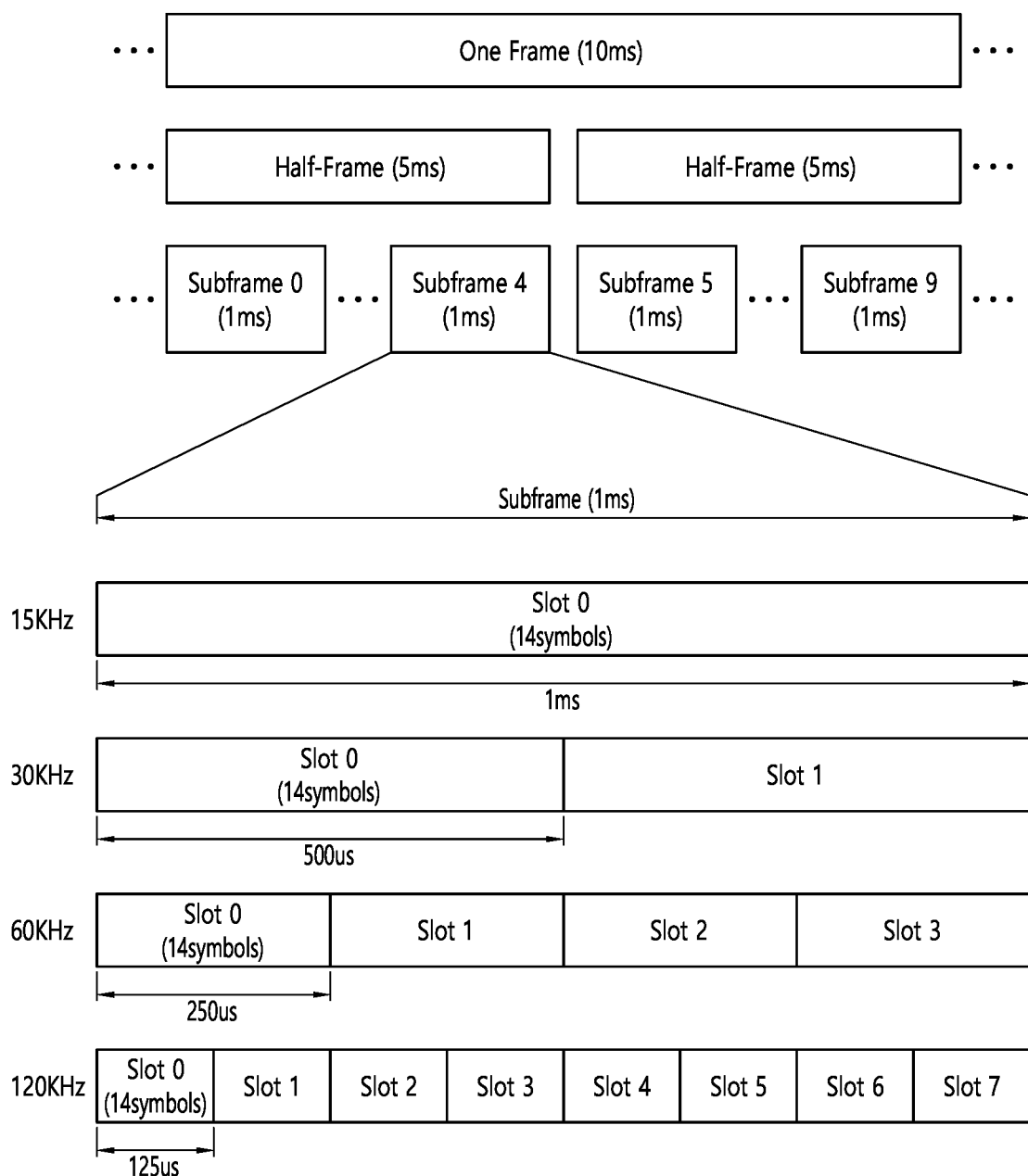
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz–6000 MHz | 15, 30, 60 kHz |
| FR2 | 24250 MHz–52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
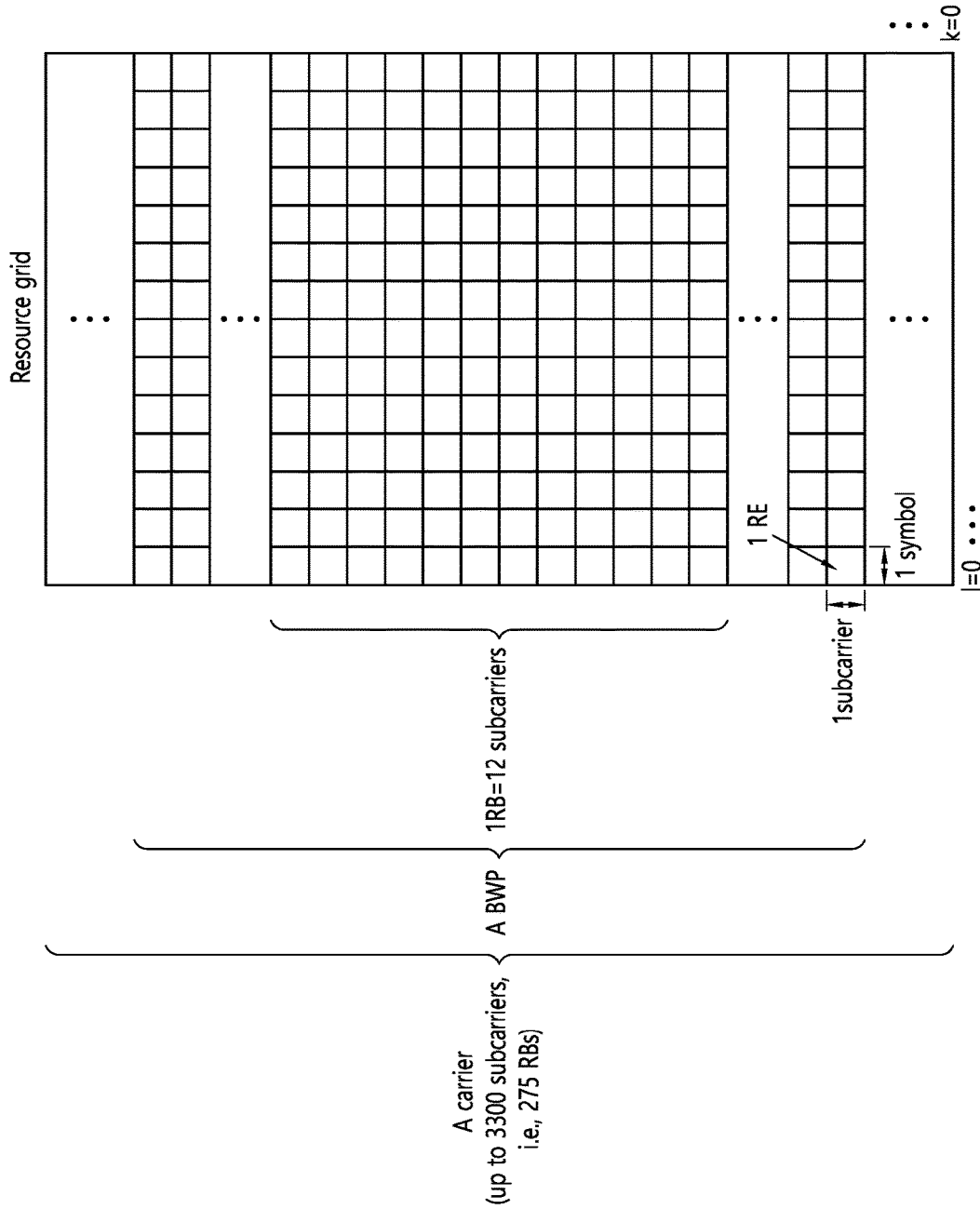
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
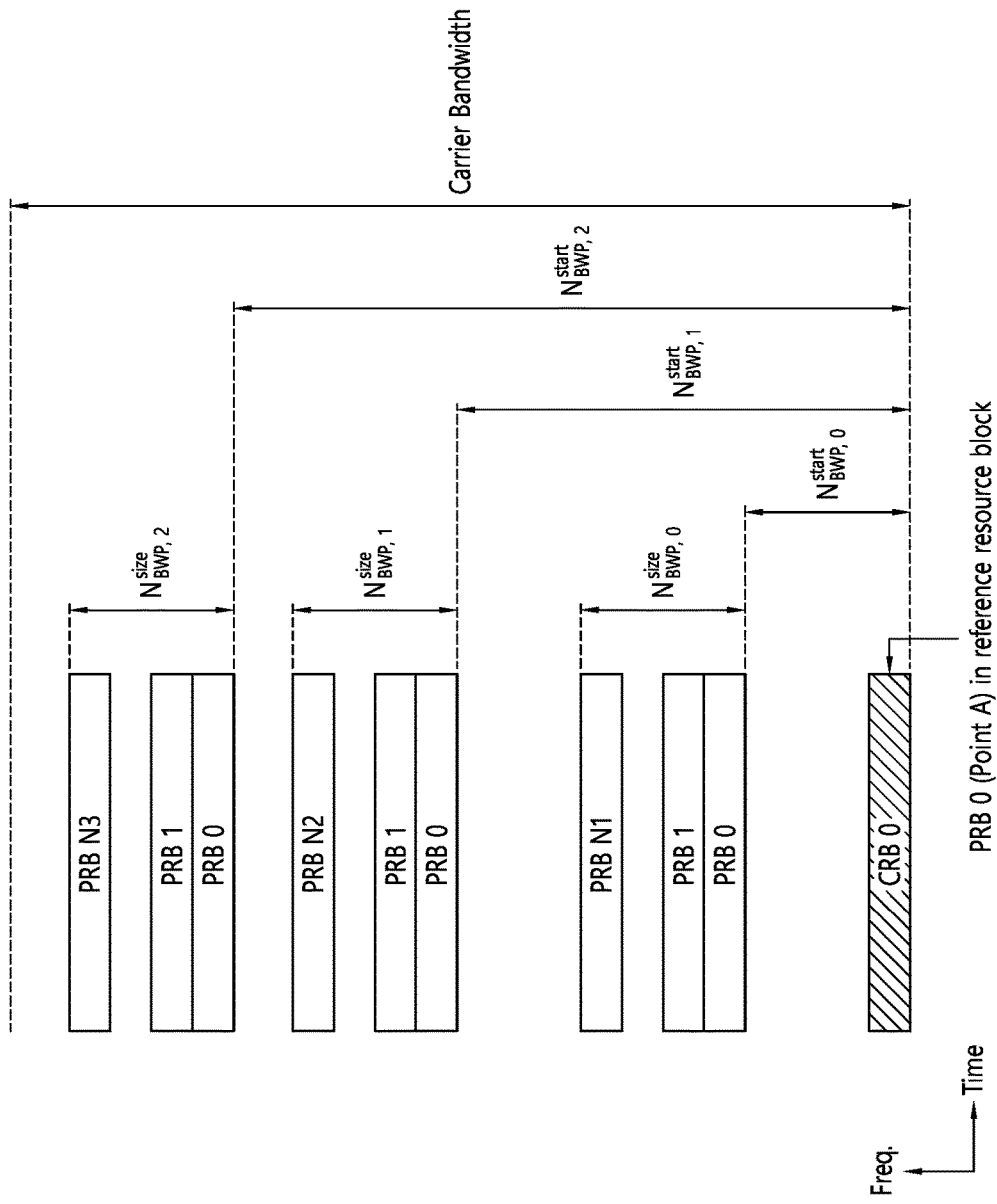
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
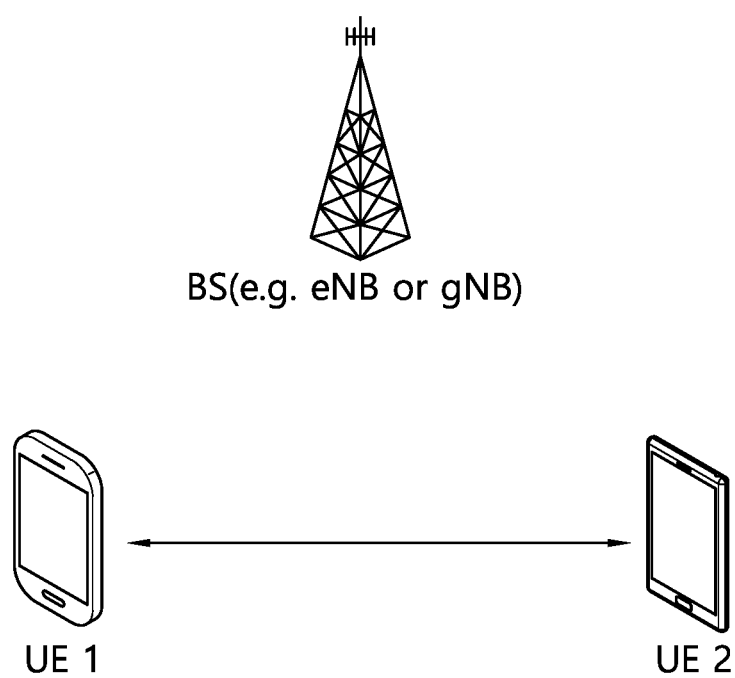
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
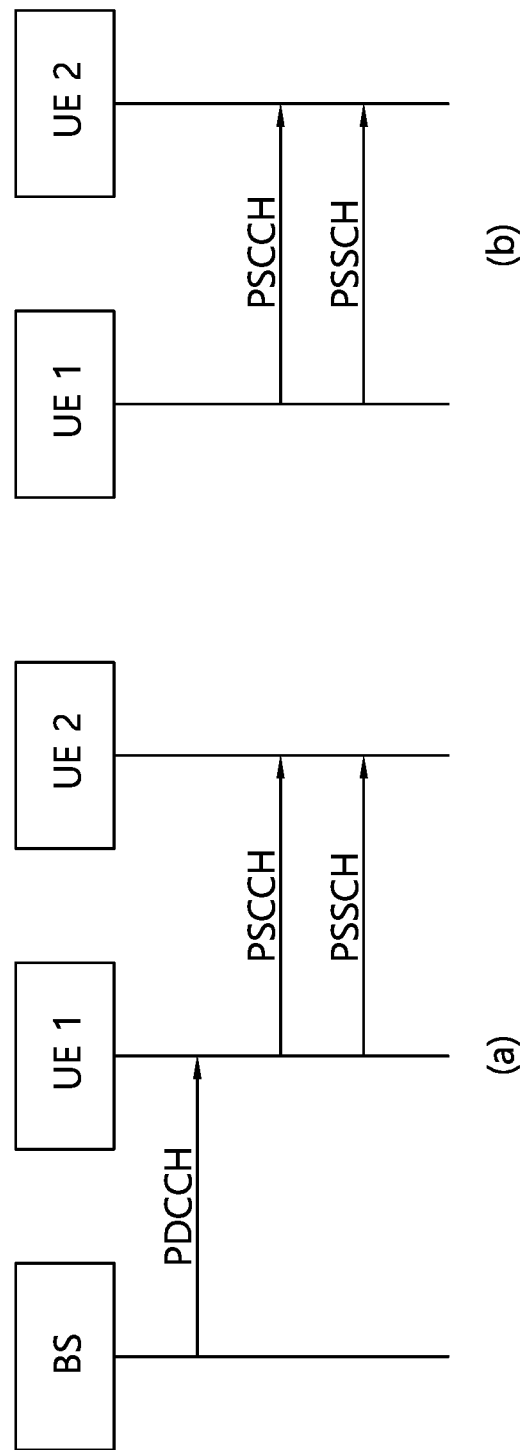
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
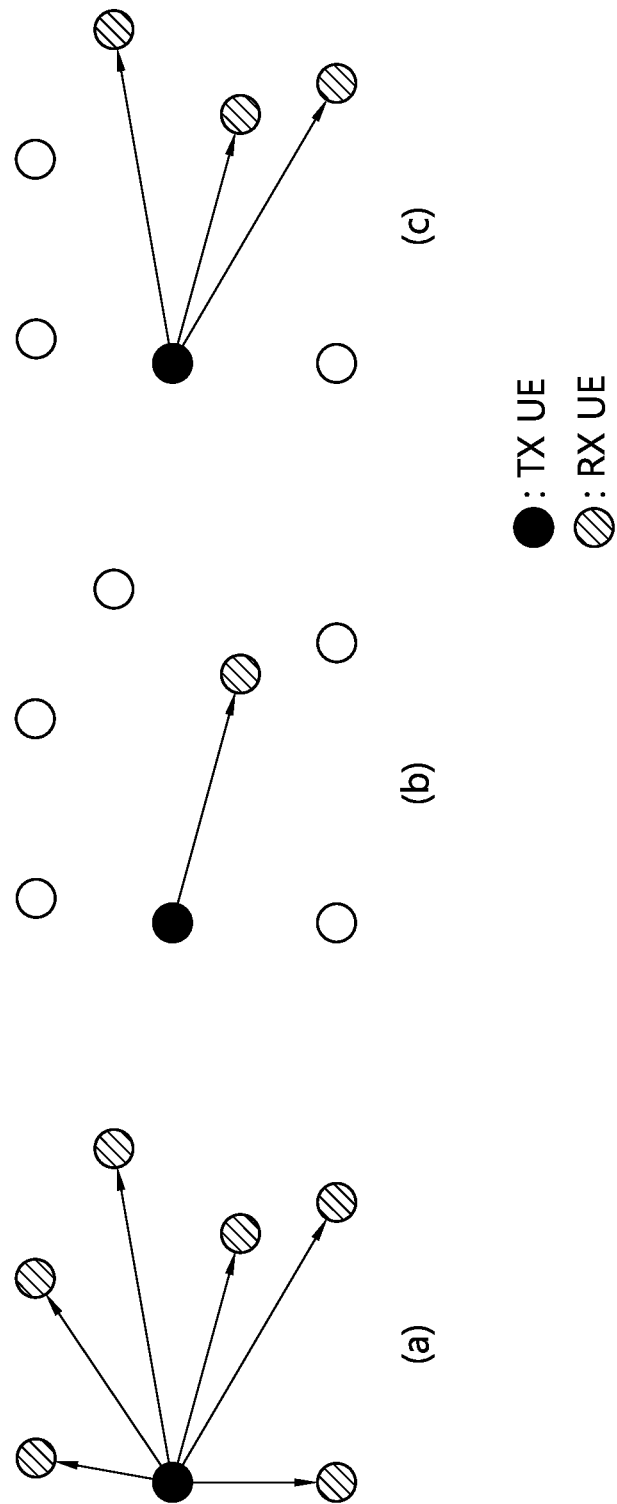
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present disclosure, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present disclosure, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 12:
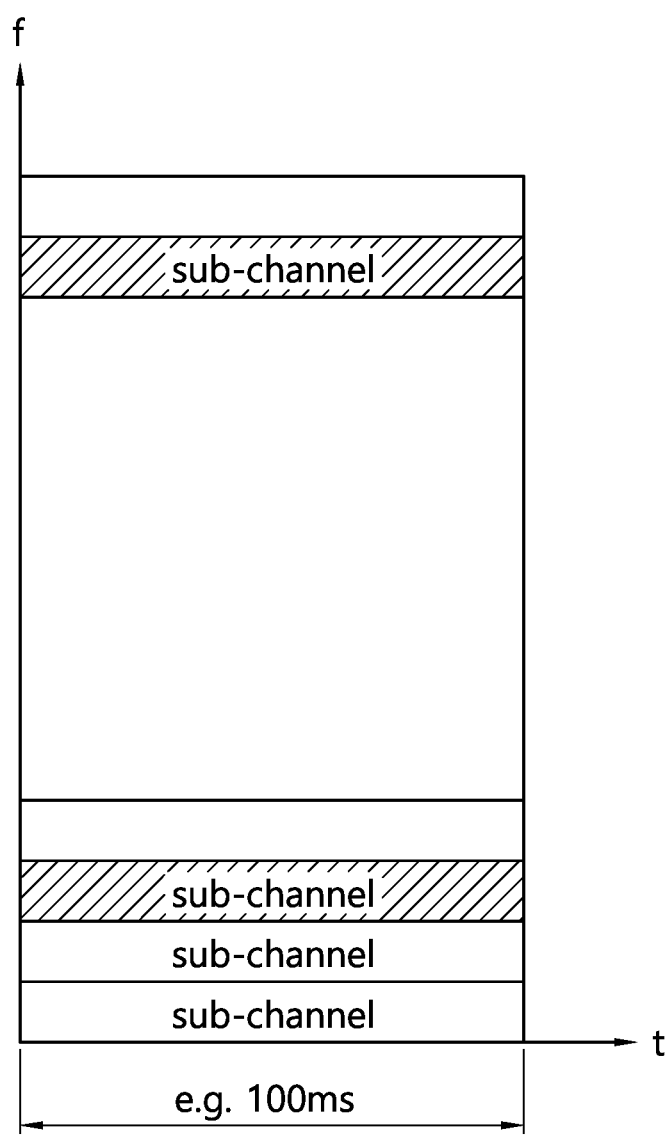
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like. Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a $1^{st}$ SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or Modulation coding scheme (MCS) information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports, and/or Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information, information related to the number of antenna ports For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

In the present disclosure, a transmitting UE may be referred to as a TX UE, and a receiving UE may be referred to as a RX UE. For example, the TX UE may include a UE which performs transmission (e.g., PSCCH transmission and/or PSSCH transmission) (to (target) RX UE(s)). For example, the TX UE may include a UE which transmits channel(s) (e.g., PSCCH and/or PSSCH) to be used for sidelink radio link monitoring (RLM) operation (of (target) RX UE(s)) and/or a UE which transmits reference signal(s) (e.g., DM-RS(s) and/or CSI-RS(s)) (on the corresponding channel(s)). For example, the TX UE may include a UE which transmits channel(s) (e.g., PSCCH and/or PSSCH) to be used for sidelink radio link failure (RLF) operation (of (target) RX UE(s)) and/or a UE which transmits reference signal(s) (e.g., DM-RS(s) and/or CSI-RS(s)) (on the corresponding channel(s)).

In the present disclosure, for example, the RX UE may include a UE which transmits HARQ feedback (to the TX UE) based on whether or not decoding of data received from the TX UE succeeds. For example, the RX UE may include a UE which transmits HARQ feedback (to the TX UE) based on whether or not detection/decoding of a PSCCH (related to the scheduling of a PSSCH) transmitted by the TX UE succeeds. For example, the RX UE may include a UE which performs its own data transmission (to the TX UE). For example, the RX UE may include a UE which performs RLM operation(s) and/or RLF operation(s) based on (pre-configured) channel(s) (e.g., PSCCH and/or PSSCH) and/or reference signal(s) (e.g., DM-RS(s) and/or CSI-RS(s)) (on the corresponding channel(s)) received from the TX UE.

In the present disclosure, the term "configure or define" may be interpreted as being (pre-)configured (through pre-defined signaling (e.g., SIB, MAC signaling, RRC signaling)) from a base station or a network. For example, the term "A may be configured" may include "a base station or a network (pre-)configures/defines or informs A for a UE". Alternatively, the term "configure or define" may be interpreted as being configured or defined in advance in the system. For example, "A may be configured" may include "A is configured/defined in advance in the system". Also, in the present disclosure, the term "RLF" may be extended and interpreted as at least one of OUT-OF-SYNCH and IN-SYNCH. For example, the RLF may include at least one of OUT-OF-SYNCH and/or IN-SYNCH. In addition, in the present disclosure, the term "channel and/or signal" may be extended and interpreted as data and/or control information. For example, transmission/reception of channel(s) and/or signal(s) may include transmission/reception of data and/or control information.

In the present disclosure, for example, since the TX UE may transmit the SCI, the first SCI and/or the second SCI to the RX UE via a PSCCH, the PSCCH may be replaced with the SCI and/or the first SCI and/or the second SCI, or vice versa. Additionally/alternatively, the SCI may be replaced with the PSCCH and/or the first SCI and/or the second SCI, or vice versa. Additionally/alternatively, for example, since the TX UE may transmit the second SCI to the RX UE through a PSSCH, the PSSCH may be replaced with the second SCI, or vice versa.

In the present disclosure, for example, since the RLF may be determined based on OUT-OF-SYNCH indication(s) or IN-SYNCH indication(s), the RLF may be replaced with OUT-OF-SYNCH or IN-SYNCH, or vice versa.

In the present disclosure, for example, packet(s) or traffic(s) may be replaced with transport block(s) (TB(s)) or MAC PDU(s) according to a transmitted layer, or vice versa.

In the present disclosure, for example, a source ID may be replaced with a destination ID, or vice versa. For example, an L1 ID may be replaced with an L2 ID, or vice versa. For example, the L1 ID may be an L1 source ID or an L1 destination ID. For example, the L2 ID may be an L2 source ID or an L2 destination ID.

Meanwhile, in order to efficiently manage/support SL communication between different UEs, for example, in order to efficiently manage/support SL communication based on PC5 RRC connection between different UEs, RLM operation(s) and/or RLF operation(s) may be configured for UE(s). Herein, for example, a lower layer (e.g., PHY layer) of a UE may inform a higher layer (e.g., RRC layer) (of the UE) of whether or not out-of-synch(s) (OOS(s)) and/or in-synch(s) (IS(s)) has occurred. For example, the upper layer may compare the occurrence/frequency of OOS(s) and/or the occurrence/frequency of IS(s) (reported from the lower layer) with pre-configured threshold(s). For example, the upper layer may compare the time (duration) of OOS(s) and/or the time (duration) of IS(s) (reported from the lower layer) with a pre-configured timer value. In addition, based on the comparison, the UE may (finally) determine whether or not to declare the RLF. For example, if the frequency of occurrence of OOS(s) and/or the time (duration) of OOS(s) exceeds a threshold, the UE may (finally) declare RLF. For example, if the frequency of occurrence of IS(s) and/or the time (duration) of IS(s) does not exceed a threshold, the UE may (finally) declare the RLF. For example, if an error rate of a pre-defined channel (e.g., PSCCH) exceeds a threshold, the lower layer of the UE may inform the upper layer (of the UE) of OOS(s). For example, if an error rate of a pre-defined channel (e.g., PSCCH) does not exceed a threshold, the lower layer of the UE may inform the upper layer (of the UE) of IS(s). For example, the error rate may be a hypothetical error rate. For example, the threshold may be pre-configured for the UE. For example, the threshold related to OOS(s) and the threshold related to IS(s) may be configured differently or independently for the UE.

As described above, in the case of sidelink communication, the RX UE may need to perform RLM operation(s) for the TX UE. Furthermore, depending on channel condition(s) between the RX UE and the TX UE, the RX UE may need to declare an RLF for the TX UE. Hereinafter, based on various embodiments of the present disclosure, a method for a RX UE to efficiently determine/declare OOS(s) and/or IS(s), and an apparatus supporting the same, will be described.

For example, in method(s), procedure(s) and/or device(s) proposed in the present disclosure, parameter(s) and/or information used by the UE to determine OOS(s) and/or IS(s) may be configured differently or independently based on a type of a service. For example, in method(s), procedure(s) and/or device(s) proposed in the present disclosure, parameter(s) and/or information used by the UE to determine OOS(s) and/or IS(s) may be configured differently or independently based on a priority of a service. For example, in method(s), procedure(s) and/or device(s) proposed in the present disclosure, parameter(s) and/or information used by the UE to determine OOS(s) and/or IS(s) may be configured differently or independently based on a cast type (e.g., unicast or groupcast). For example, in method(s), procedure(s) and/or device(s) proposed in the present disclosure, parameter(s) and/or information used by the UE to determine OOS(s) and/or IS(s) may be configured differently or independently based on a service requirement (e.g., reliability or delay). For example, in method(s), procedure(s) and/or device(s) proposed in the present disclosure, parameter(s) and/or information used by the UE to determine OOS(s) and/or IS(s) may be configured differently or independently based on a channel busy ratio (CBR). For example, in method(s), procedure(s) and/or device(s) proposed in the present disclosure, parameter(s) and/or information used by the UE to determine OOS(s) and/or IS(s) may be configured differently or independently based on a channel congestion level. For example, in method(s), procedure(s) and/or device(s) proposed in the present disclosure, parameter(s) and/or information used by the UE to determine OOS(s) and/or IS(s) may be configured differently or independently based on a SL RPRP value. For example, in method(s), procedure(s) and/or device(s) proposed in the present disclosure, parameter(s) and/or information used by the UE to determine OOS(s) and/or IS(s) may be configured differently or independently based on a SL CSI value. For example, in method(s), procedure(s) and/or device(s) proposed in the present disclosure, parameter(s) and/or information used by the UE to determine OOS(s) and/or IS(s) may be configured differently or independently based on velocity (or speed) of the UE. For example, in method(s), procedure(s) and/or device(s) proposed in the present disclosure, parameter(s) and/or information used by the UE to determine OOS(s) and/or IS(s) may be configured differently or independently based on a type of a synchronization reference. For example, the parameter(s) and/or the information may include at least one of information on the number of receptions of channel(s)/signal(s), information on the number of receptions of pre-configured channel(s)/signal(s), and/or information on a time period.

For example, based on at least one of a type of a service, a priority of a service, a cast type, a service requirement, a CBR, a channel congestion level, a SL RPRP value, a SL CSI value, velocity (or speed) of a UE, and/or a type of a synchronization reference, parameter(s) and/or information used by the UE to determine OOS(s) and/or IS(s) may be configured differently or independently for each resource pool. For example, based on at least one of a type of a service, a priority of a service, a cast type, a service requirement, a CBR, a channel congestion level, a SL RPRP value, a SL CSI value, velocity (or speed) of a UE, and/or a type of a synchronization reference, parameter(s) and/or information used by the UE to determine OOS(s) and/or IS(s) may be configured differently or independently for each carrier. For example, based on at least one of a type of a service, a priority of a service, a cast type, a service requirement, a CBR, a channel congestion level, a SL RPRP value, a SL CSI value, velocity (or speed) of a UE, and/or a type of a synchronization reference, parameter(s) and/or information used by the UE to determine OOS(s) and/or IS(s) may be configured differently or independently for each session.

Figure 13:
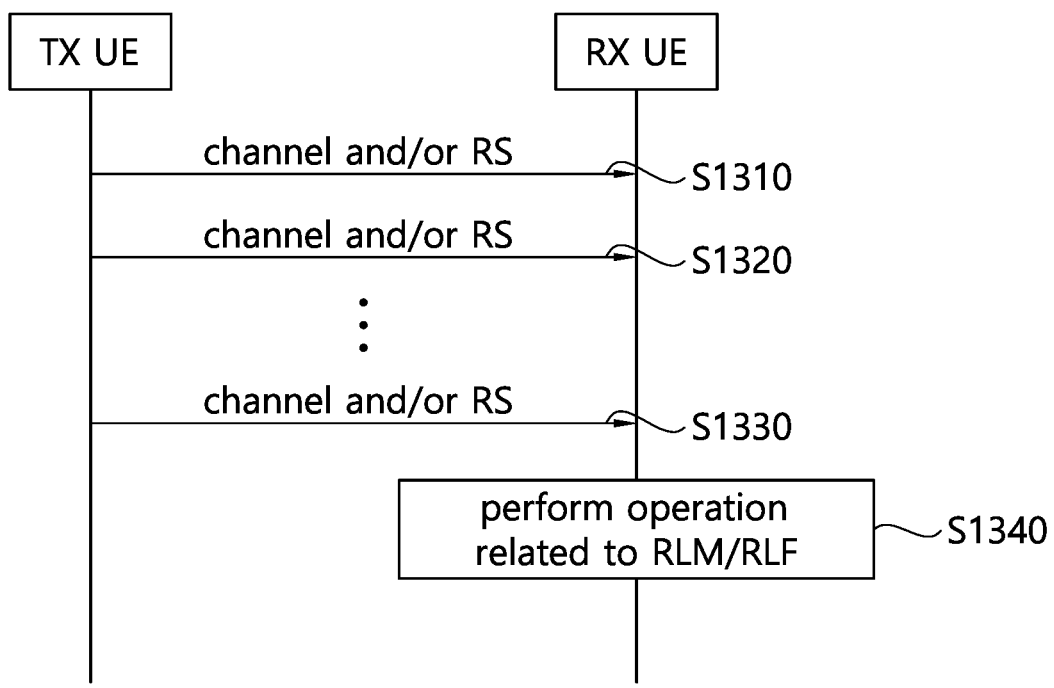
FIG. 13 shows a procedure for a RX UE to perform RLM operation(s) and/or RLF operation(s) based on channel(s) and/or reference signal(s) transmitted by a TX UE, based on an embodiment of the present disclosure.

FIG. 13 shows a procedure for a RX UE to perform RLM operation(s) and/or RLF operation(s) based on channel(s) and/or reference signal(s) transmitted by a TX UE, based on an embodiment of the present disclosure. The embodiment of FIG. 13 may be combined with various embodiments of the present disclosure.

Referring to FIG. 13, in steps S1310 to S1330, a TX UE may transmit channel(s) and/or reference signal(s). For example, for RLM operation(s) and/or RLF operation(s) of a RX UE, the TX UE may transmit channel(s) and/or reference signal(s). For example, the channel(s) may be pre-defined channel(s). For example, the channel(s) may be pre-defined control channel(s). For example, the channel(s) may include a PSCCH and/or a PSSCH. For example, the reference signal(s) may be transmitted through the channel(s). For example, the reference signal(s) may include DM-RS(s) and/or CSI-RS(s).

For example, the TX UE may transmit channel(s) and/or reference signal(s) by differently designating/configuring a sequence of the reference signal(s) on the channel(s) for each transmission. For example, the TX UE may transmit channel(s) and/or reference signal(s) by differently designating/configuring a sequence of the reference signal(s) on the channel(s) for each number of transmissions in a pre-configured unit. For example, in the embodiment of FIG. 13, a sequence of reference signal(s) transmitted in step S1310, a sequence of reference signal(s) transmitted in step S1320, and a sequence of reference signal(s) transmitted in step S1330 may be different from each other. For example, assuming that the TX UE transmits channel(s) four times, the TX UE may differently designate/configure a sequence of reference signal(s) transmitted through each channel and transmit it to the RX UE.

For example, when the TX UE transmits channel(s) and/or reference signal(s), the TX UE may indicate the transmission order of the channel(s) and/or the reference signal(s) through a pre-defined field (for the purpose) included in a SCI related to the channel(s). For example, when the TX UE transmits channel(s) and/or reference signal(s), the TX UE may indicate the transmission order of the channel(s) and/or the reference signal(s) among the number of transmissions in a pre-configured unit through a pre-defined field (for the purpose) included in a SCI related to the channel(s). For example, the field may be limitedly present only in the case of a specific cast type (e.g., unicast). For example, assuming that the TX UE transmits channel(s) four times, the TX UE may inform the RX UE of the transmission order of a specific channel by using a field included in each SCI related to each channel. For example, in the embodiment of FIG. 13, the TX UE may inform the RX UE that channel(s) and/or reference signal(s) is the first transmitted channel(s) and/or reference signal(s) through a SCI related to the channel(s) transmitted in step S1310, and the TX UE may inform the RX UE that channel(s) and/or reference signal(s) is the second transmitted channel(s) and/or reference signal(s) through a SCI related to the channel(s) transmitted in step S1320, and the TX UE may inform the RX UE that channel(s) and/or reference signal(s) is the N-th transmitted channel(s) and/or reference signal(s) through a SCI related to the channel(s) transmitted in step S1330.

If the proposed method is applied, for example, the RX UE may obtain/determine the number of channels missed by the RX UE or the ratio of channels missed by the RX UE among all K channels transmitted by the TX UE, based on sequence detection of the reference signal(s) on the channel(s) and/or decoding of the SCI related to the channel(s). For example, the RX UE may obtain/determine the number of channels missed by the RX UE or the ratio of channels missed by the RX UE among all K channels transmitted by the TX UE within a pre-configured time period, based on sequence detection of the reference signal(s) on the channel(s) and/or decoding of the SCI related to the channel(s).

For example, mapping/linkage between the sequence of the reference signal(s) and the number of transmissions (in a pre-configured unit) may be configured or pre-configured for the TX UE and/or the RX UE. For example, mapping/linkage between the sequence of the reference signal(s) and the number of transmissions (in a pre-configured unit) may be configured or pre-configured for the TX UE and/or the RX UE for each resource pool. For example, a base station and/or a network may transmit information related to mapping/linkage between the sequence of the reference signal(s) and the number of transmissions (in a pre-configured unit) to the TX UE and/or the RX UE. For example, mapping/linkage between a field state/bit value included in the SCI and the number of transmissions (in a pre-configured unit) may be configured or pre-configured for the TX UE and/or the RX UE. For example, mapping/linkage between a field state/bit value included in the SCI and the number of transmissions (in a pre-configured unit) may be configured or pre-configured for the TX UE and/or the RX UE for each resource pool. For example, a base station and/or a network may transmit information related to mapping/linkage between a field state/bit value included in the SCI and the number of transmissions (in a pre-configured unit) to the TX UE and/or the RX UE.

For example, the number of sequences of the reference signal(s) (hereinafter, RS_NUM) and/or the number of (total) states indicated/represented by a field included in the SCI (hereinafter, ST_NUM) may be configured to be smaller than K. In this case, for example, the RX UE may derive/deduce the order of transmission received by the RX UE, among K transmissions by the TX UE, based on a modulo algorithm. For example, the RX UE may derive/deduce the order of transmission missed by the RX UE, among K transmissions by the TX UE, based on a modulo algorithm. For example, the modulo algorithm may be an algorithm which derives a remainder. For example, $y = \text{MODULO}(a, b)$ may be a function which derives the remainder of dividing a by b. Specifically, for example, if K is 3, and RS_NUM is 2, the RX UE may determine/identify 1st transmission (K=1), 2nd transmission (K=2), and 3rd transmission (K=3) (of the TX UE) based on each sequence of reference signal(s) mapped/linked to 1, 0, and 1, by using the MODULO (K, 2) algorithm. For example, if K is 3, and ST_NUM is 2, the RX UE may determine/identify 1st transmission (K=1), 2nd transmission (K=2), and 3rd transmission (K=3) (of the TX UE) based on each field state/bit value included in the SCI mapped/linked to 1, 0, and 1, by using the MODULO (K, 2) algorithm.

In step S1340, if the number of missing or the ratio of missing exceeds a pre-configured OOS (declaration) threshold, the lower layer (of the RX UE) may transfer OOS occurrence information/indication to the upper layer. For example, if the number of missing or the ratio of missing exceeds a pre-configured OOS (declaration) threshold, it may be defined/configured to declare an RLF. For example, if the number of missing or the ratio of missing exceeds a pre-configured OOS (declaration) threshold, the RX UE may declare an RLF.

For example, it may be defined to generate the sequence of the reference signal(s) on the channel(s) based on a pre-defined function using a source ID of the TX UE and/or a destination ID of the RX UE as a seed value or an input value. For example, the TX UE may generate the sequence of the reference signal(s) on the channel(s) based on the source ID of the TX UE and/or the destination ID of the RX UE. For example, it may be defined to include the source ID of the TX UE and/or the destination ID of the RX UE in the SCI related to the channel(s). For example, the TX UE may transmit the SCI including the source ID of the TX UE and/or the destination ID of the RX UE to the RX UE. In this case, for example, the RX UE may derive/obtain an error rate related to the PSCCH based on blind detection of the sequence of the reference signal(s). For example, the error rate may be a hypothetical error rate. For example, the source ID may be a L1 source ID or a L2 source ID. For example, the destination ID may be a L1 destination ID or a L2 destination ID.

For example, RLM operation(s) and/or RLF operation(s) may be configured through PC5 RRC signaling between the TX UE and the RX UE. For example, RLM operation(s) and/or RLF operation(s) may be configured for each service for each resource pool through PC5 RRC signaling between the TX UE and the RX UE. For example, the service may include at least one of a type of a service, a priority of a service, and/or a service requirement. For example, RLM operation(s) and/or RLF operation(s) may be configured for each cast type for each resource pool through PC5 RRC signaling between the TX UE and the RX UE. For example, only for a service to which packet(s)/traffic(s) needs to be periodically transmitted, RLM operation(s) and/or RLF operation(s) may be limitedly configured for the UE. For example, only for a service to which packet(s)/traffic(s) should be transmitted bursty, RLM operation(s) and/or RLF operation(s) may be limitedly configured for the UE.

For example, at least one of the following information to be used for RLM operation(s) and/or RLF operation(s) may be exchanged, through PC5 RRC signaling between the TX UE and the RX UE.

information on the sequence of the reference signal(s) (e.g., information on the number of sequences and/or a seed value for generating the sequence, or information on an input value, etc.), and/or information on mapping/linkage between the sequence of the reference signal(s) and the number of transmissions (in a pre-configured unit), and/or information on mapping/linkage between the field state/bit value included in the SCI and the number of transmissions (in a pre-configured unit), and/or information on the time period to perform determination for OOS and/or IS, and/or information on the frequency/number of sequences of reference signal(s) transmitted for RLM operation(s) and/or RLF operation(s) within the time period, and/or information on the frequency/number of channels transmitted for RLM operation(s) and/or RLF operation(s) within the corresponding time period;

Additionally, based on an embodiment of the present disclosure, channel transmission by the TX UE may include PSCCH only transmission, PSSCH only transmission, or (simultaneous) transmission of PSCCH and PSSCH. For example, the channel transmission performed by the TX UE for RLM operation(s) and/or the RLF operation(s) of the RX UE may include PSCCH only transmission, PSSCH only transmission, or (simultaneous) transmission of PSCCH and PSSCH.

For example, when the TX UE transmits the PSCCH and the PSSCH (simultaneously), the PSSCH may be configured with dummy information/packet(s). For example, the dummy information/packet(s) may be pre-configured information/packet(s). For example, when the TX UE transmits the PSCCH and the PSSCH (simultaneously), the TX UE may perform PSSCH transmission without a MAC PDU. For example, in order to guarantee accuracy related to RLM operation(s) and/or RLF operation(s) of the RX UE even though the TX UE has no data to actually transmit, the TX UE may perform PSCCH transmission and PSSCH transmission by including dummy information/packet(s) in the PSSCH. For example, in order to guarantee accuracy related to RLM operation(s) and/or RLF operation(s) of the RX UE to be greater than or equal to a pre-configured threshold level even though the TX UE has no data to actually transmit, the TX UE may perform PSCCH transmission and PSSCH transmission by including dummy information/packet(s) in the PSSCH.

For example, when the TX UE transmits the PSCCH and the PSSCH (simultaneously), the TX UE may perform PSCCH transmission and PSSCH transmission by including the remaining bits in the PSSCH except for some bits of a L2 source ID and/or a L2 destination ID included in the PSCCH. For example, when the TX UE transmits the PSCCH and the PSSCH (simultaneously), the TX UE may perform PSCCH transmission and PSSCH transmission by including the remaining bits in the PSSCH except for a L1 source ID and/or a L1 destination ID included in the PSCCH. For example, when the TX UE transmits the PSCCH and the PSSCH (simultaneously), the TX UE may perform PSCCH transmission and PSSCH transmission by including a L2 source ID and/or a L2 destination ID in the PSSCH.

For example, when the TX UE transmits the PSCCH and the PSSCH (simultaneously), the PSSCH may include SL CSI-RS(s). For example, SL CSI-RS(s) may always be included in the PSCCH. For example, SL CSI-RS(s) may be reference signal(s) used by the RX UE to obtain SL CSI. For example, SL CSI-RS(s) may be reference signal(s) used by the RX UE to measure SL (L1) RSRP. For example, the size of resource(s) used by the TX UE to transmit the (corresponding) PSSCH and/or the (related) PSCCH may be pre-configured. For example, the size of resource(s) may include the size of time resource(s) and/or the size of frequency resource(s). For example, the size of resource(s) may be one sub-channel.

For example, when the TX UE transmits the PSCCH and the PSSCH (simultaneously), the RX UE may be configured not to transmit HARQ feedback for the (corresponding) PSSCH. For example, when the TX UE transmits the PSCCH and the PSSCH (simultaneously), the RX UE may not transmit HARQ feedback to the TX UE in response to the PSSCH.

For example, when the TX UE transmits the PSCCH and the PSSCH (simultaneously), the RX UE may be configured to transmit HARQ feedback for the (corresponding) PSSCH in order for RLM operation(s) and/or RLF determination by the TX UE. For example, when the TX UE transmits the PSCCH and the PSSCH (simultaneously), the RX UE may transmit HARQ feedback to the TX UE in response to the PSSCH in order for RLM operation(s) and/or RLF determination by the TX UE. In this case, for example, the TX UE may determine OOS or IS based on HARQ feedback information (e.g., NACK) transmitted by the RX UE. For example, the TX UE may determine OOS or IS based on whether or not HARQ feedback is transmitted by the RX UE.

For example, when the TX UE transmits the PSCCH and the PSSCH (simultaneously), the TX UE may indicate to the RX UE that the transmission is for RLM purpose and/or RLF purpose by using a SCI field on the PSCCH. For example, when the TX UE transmits the PSCCH and the PSSCH (simultaneously), the TX UE may inform the RX UE that the transmission of the PSCCH and the PSSCH is for RLM operation(s) and/or RLF operation(s) through the SCI field on the PSCCH. For example, the PSCCH may be related to the PSSCH.

For example, when the TX UE transmits only the PSCCH (i.e., PSCCH only transmission), the TX UE may indicate to the RX UE that the transmission is for RLM purpose and/or RLF purpose by using a SCI field on the PSCCH. For example, when the TX UE transmits only the PSCCH (i.e., PSCCH only transmission), the TX UE may inform the RX UE that the transmission of the PSCCH is for RLM operation(s) and/or RLF operation(s) through the SCI field on the PSCCH.

For example, when the TX UE transmits only the PSSCH (i.e., PSSCH only transmission), the TX UE may indicate to the RX UE that the transmission is for RLM purpose and/or RLF purpose by using a SCI field (e.g., 2nd SCI field) on the PSSCH. For example, when the TX UE transmits only the PSSCH (i.e., PSSCH only transmission), the TX UE may inform the RX UE that the transmission of the PSSCH is for RLM operation(s) and/or RLF operation(s) through the SCI field (e.g., 2nd SCI field) on the PSSCH.

For example, when the TX UE transmits only the PSCCH (i.e., PSCCH only transmission), the RX UE may be configured to transmit HARQ feedback for the PSCCH, in order for RLM operation(s) and/or RLF determination by the TX UE. For example, when the TX UE transmits the PSCCH and the PSSCH (simultaneously), the RX UE may transmit HARQ feedback to the TX UE in response to the PSCCH, in order for RLM operation(s) and/or RLF determination by the TX UE.

For example, when the TX UE transmits only the PSCCH (i.e., PSCCH only transmission), the TX UE may map pre-configured dummy information/packet(s) on the first symbol. For example, the first symbol may be the first symbol in a slot. For example, the first symbol may be a period used for automatic gain control (AGC). For example, when the TX UE transmits only PSCCH (i.e., PSCCH only transmission), the TX UE may (actually) map a SCI or PSCCH only information from the second symbol. For example, the second symbol may be the second symbol in a slot. Herein, for example, the size of frequency resources on the first symbol may be (1) assumed/determined to be the same as the size of frequency resources related to PSCCH only transmission, or (2) defined to be a pre-configured value (e.g., one sub-channel). Herein, for example, the TX UE may apply a pre-configured modulation coding scheme (MCS) value (e.g., QPSK) for the information/packet(s) mapped on the first symbol. Herein, for example, the TX UE may (equally) determine/derive transmit power on the first symbol, based on power control parameter(s) related to PSCCH only or PSCCH (e.g., PO, ALPHA).

For example, if at least one of the following conditions is satisfied, the TX UE may perform i) PSCCH only transmission, ii) PSSCH only transmission, or iii) transmission of PSCCH and PSSCH. In this case, for example, even if the TX UE detects an RLF and/or an OOS, the TX UE may not declare the RLF. That is, if at least one of the following conditions is satisfied, the TX UE may perform i) PSCCH only transmission, ii) PSSCH only transmission, or iii) transmission of PSCCH and PSSCH before declaring the RLF, if the TX UE detects the RLF and/or the OOS.

For example, even if the TX UE does not reach the RLF, the TX UE may perform i) PSCCH only transmission, ii) PSSCH only transmission, or iii) transmission of PSCCH and PSSCH before declaring the RLF, if the TX UE determines that a PC5 link condition is not good and the TX UE has no data to transmit to the RX UE. Through this, the TX UE may help RLM operation(s) of the RX UE. Herein, for example, if at least one of the following conditions is satisfied, the TX UE may determine that the PC5 link condition between the TX UE and the RX UE is not good.

1) First condition: for example, if the upper layer of the TX UE receives OOC indication(s) from the physical layer once or consecutively N times For example, the number of OOC indications received may not reach the maximum threshold. For example, the number of OOC indications received may not reach the maximum threshold related to RLF declaration. For example, in this case, the TX UE may not declare an RLF, and the TX UE may be maintaining a PC5 connection (e.g., a PC5 wireless connection or a PC5 RRC connection) with the RX UE.

2) Second condition: for example, if the TX UE receives HARQ NACK(s) from the RX UE once or consecutively N times For example, the number of HARQ NACKs received may not reach the maximum threshold value. For example, the number of HARQ NACKs received may not reach the maximum threshold value related to RLF declaration. For example, in this case, the TX UE may not declare an RLF, and the TX UE may be maintaining a PC5 connection (e.g., a PC5 wireless connection or a PC5 RRC connection) with the RX UE.

3) Third condition: if the TX UE does not receive HARQ feedback in response to data transmitted to the RX UE, for example, if the TX UE does not receive HARQ feedback once in response to data transmitted to the RX UE, for example, if the TX UE does not receive HARQ feedback consecutively N times in response to data transmitted to the RX UE For example, the number of times that HARQ feedback is not received may not reach the maximum threshold. For example, the number of times that HARQ feedback is not received may not reach the maximum threshold related to RLF declaration. For example, in this case, the TX UE may not declare an RLF, and the TX UE may be maintaining a PC5 connection (e.g., a PC5 wireless connection or a PC5 RRC connection) with the RX UE.

Figure 14:
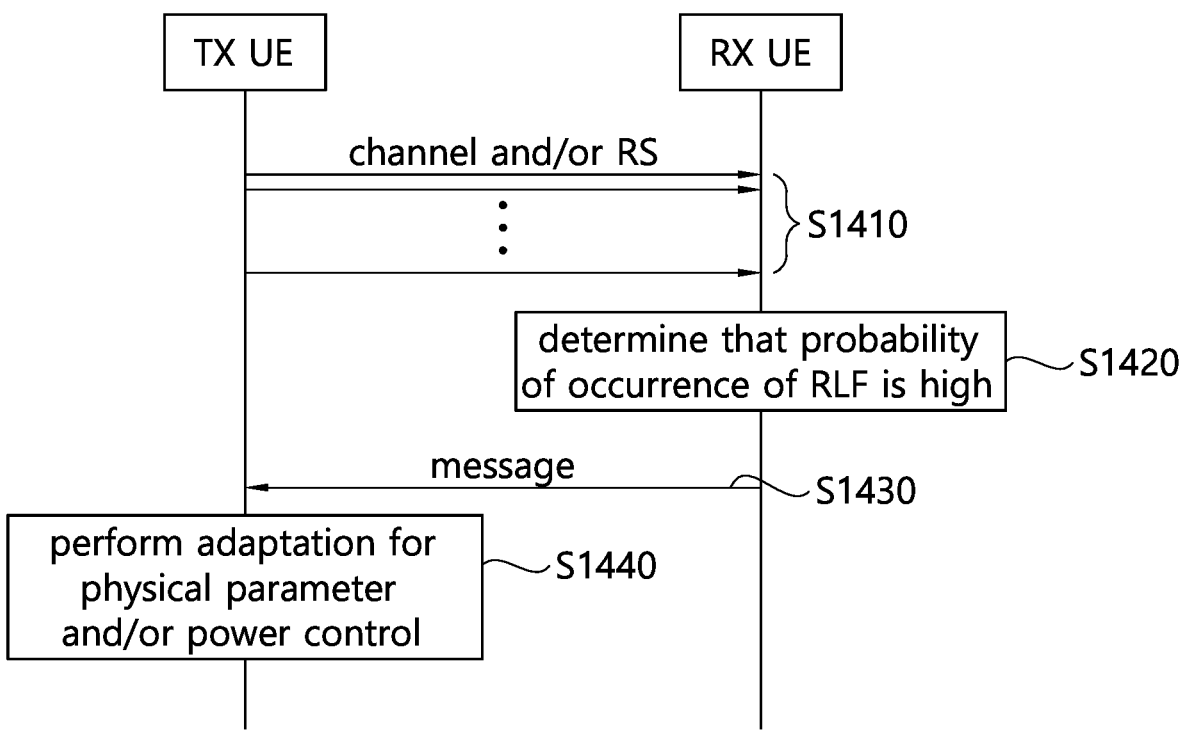
FIG. 14 shows a procedure for a RX UE to transmit a message informing/indicating that an RLF is expected, based on an embodiment of the present disclosure.

FIG. 14 shows a procedure for a RX UE to transmit a message informing/indicating that an RLF is expected, based on an embodiment of the present disclosure. The embodiment of FIG. 14 may be combined with various embodiments of the present disclosure.

Referring to FIG. 14, in step S1410, a TX UE may transmit channel(s) and/or reference signal(s) to a RX UE. For example, the channel(s) may be pre-defined channel(s). For example, the channel(s) may be PSCCH(s). In step S1420, the RX UE may predict/estimate whether or not an error rate for the channel(s) exceeds a threshold based on channel(s) and/or reference signal(s) transmitted by the TX UE. For example, if the RX UE predicts/estimates that the error rate for the channel(s) exceeds a threshold, in step S1430, the RX UE may transmit a message informing/indicating the status to the TX UE. For example, the message informing/indicating the status may be an RLF ready indication. For example, the error rate may be a hypothetical error rate. For example, the threshold may be pre-configured for the RX UE. For example, the RX UE may inform (in advance) the TX UE that a probability of occurrence of an RLF is high due to poor SL quality. For example, the RX UE may inform (in advance) the TX UE that a probability of occurrence of an RLF is higher than a pre-configured threshold due to poor SL quality. Therefore, in step S1440, the TX UE receiving the message may perform adaptation for physical parameter(s) and/or power control, etc., and trough this, an RLF between the TX UE and the RX UE can be avoided (as much as possible). For example, the physical parameter(s) may include at least one of a MCS, a transmission scheme, a resource size, and/or a coding rate.

Based on an embodiment of the present disclosure, the TX UE needs to guarantee accuracy related to RLM operation(s) and/or RLF operation(s) of the RX UE. For example, the TX UE needs to guarantee accuracy related to RLM operation(s) and/or RLF operation(s) of the RX UE to be greater than or equal to a pre-configured threshold level. To this end, the TX UE may transmit CSI-RS(s) and/or CSI report request(s) more than or equal to the certain number of times. For example, the TX UE may transmit CSI-RS(s) and/or CSI report request(s) more than or equal to the certain number of times within a pre-configured time period. For example, CSI-RS(s) may be transmitted through PSSCH(s). For example, the CSI report request may be indicated by a field included in a SCI transmitted through a PSCCH. For example, the CSI report request may be indicated by a field included in a SCI transmitted through a PSSCH. For example, the RX UE may use CSI-RS(s) transmitted by the TX UE for CSI acquisition and/or SL-RSRP measurement. For example, the TX UE may transmit the CSI report request to the RX UE for RLM operation(s) of the TX UE. Herein, for example, the TX UE may transmit CSI-RS(s) through a PSSCH (resource(s) with a pre-configured size), and the TX UE may map at least one of (pre-configured) dummy information, specific value(s), and/or specific bit(s) to the remaining resources (on the PSSCH) that are not used for transmission of the CSI-RS(s). For example, the TX UE may transmit CSI-RS(s) through a PSSCH (resource(s) with a pre-configured size), and the TX UE may leave the remaining resources (on the PSSCH) that are not used for transmission of the CSI-RS(s) (without mapping of other information). Herein, for example, a source ID of the TX UE and/or a destination ID of the RX UE may be included in a SCI field on the PSCCH related to the PSSCH related to CSI-RS transmission. For example, a source ID of the TX UE and/or a destination ID of the RX UE may be included in a SCI field on the PSCCH related to transmission of the CSI report request. For example, the source ID may be a L1 source ID or a L2 source ID. For example, the destination ID may be a L1 destination ID or a L2 destination ID.

Based on an embodiment of the present disclosure, in order for the TX UE to perform RLM operation(s) (with high accuracy), it may be necessary for the TX UE to receive channel(s)/signal(s) or data more than or equal to the certain number of times within a time period from the RX UE. For example, the time period may be pre-configured for the TX UE and/or the RX UE. For example, based on whether or not the TX UE successfully receives a PSSCH, a PSCCH related to the PSSCH, and/or reference signal(s) (e.g., DM-RS(s) or CSI-RS(s)) on the PSSCH related to data transmitted by the RX UE, the TX UE may determine SL quality between the TX UE and the RX UE and/or may perform RLM operation(s).

For example, if the TX UE does not receive channel(s)/signal(s) or data more than or equal to the pre-determined number of times from the RX UE, the TX UE may request/trigger the RX UE to transmit a SL CSI report or a SL HARQ feedback report to the TX UE. For example, if the TX UE does not receive channel(s)/signal(s) or data more than or equal to the pre-determined number of times from the RX UE, the TX UE may request/trigger the RX UE to transmit a SL CSI report or a SL HARQ feedback report to the TX UE the number of times less than the pre-determined number of times or until the insufficient number of times is satisfied. For example, the TX UE may request/trigger the RX UE to transmit a SL CSI report or a SL HARQ feedback report to the TX UE, by using an indicator field included/defined in a SCI. For example, the TX UE may transmit a message requesting/triggering transmission of a SL CSI report or a SL HARQ feedback report to the RX UE. On the other hand, for example, if the TX UE receives channel(s)/signal(s) or data more than or equal to the pre-determined number of times from the RX UE, the TX UE may not request or trigger transmission of a SL CSI report or a SL HARQ feedback report to the RX UE. For example, the TX UE may not transmit a message requesting/triggering transmission of a SL CSI report or a SL HARQ feedback report to the RX UE. Herein, for example, in the present disclosure, SL CSI and/or data may be extended/replaced with SL HARQ feedback. Herein, for example, when the RX UE transmits channel(s)/signal(s) more than or equal to the certain number of times within a time period to the TX UE (without receiving a request message from the TX UE), the transmission of channel(s)/signal(s) may be transmission of channel(s)/signal(s) (e.g., SL CSI report and/or SL HARQ feedback) pre-configured for the corresponding purpose, separately from transmission of data. For example, when the RX UE transmits channel(s)/signal(s) more than or equal to the certain number of times within a pre-configured time period for RLM operation(s) of the TX UE to the TX UE without receiving a request message from the TX UE, according to (PC5 RRC or physical layer) signaling received from the TX UE or the network/base station, the transmission of channel(s)/signal(s) may be transmission of channel(s)/signal(s) (e.g., SL CSI report and/or SL HARQ feedback) pre-configured for the corresponding purpose, separately from transmission of data. For example, if the RX UE receives a triggering/request message from the TX UE, and the RX UE transmits SL CSI, etc., this may cause an overhead problem.

For example, if the TX UE does not receive channel(s)/signal(s) from the RX UE more than or equal to the certain number of times within a time period, the TX UE may consider/determine as OOS and/or an RLF. For example, if the TX UE does not receive data from the RX UE more than or equal to the certain number of times within a time period, the TX UE may consider/determine as OOS and/or an RLF. For example, if the TX UE does not receive SL CSI report(s) from the RX UE more than or equal to the certain number of times within a time period, the TX UE may consider/determine as OOS and/or an RLF. For example, if the TX UE does not receive SL HARQ feedback report(s) from the RX UE more than or equal to the certain number of times within a time period, the TX UE may consider/determine as OOS and/or an RLF. For example, the time period may be pre-configured for the TX UE and/or the RX UE.

For example, if the TX UE does not receive channel(s)/signal(s) from the RX UE more than or equal to the certain number of times within a time period even though the TX UE has requested/triggered transmission of SL CSI report(s) or SL HARQ feedback report(s) to the RX UE, the TX UE may consider/determine as OOS and/or an RLF. For example, if the TX UE does not receive data from the RX UE more than or equal to the certain number of times within a time period even though the TX UE has requested/triggered transmission of SL CSI report(s) or SL HARQ feedback report(s) to the RX UE, the TX UE may consider/determine as OOS and/or an RLF. For example, if the TX UE does not receive SL CSI report(s) from the RX UE more than or equal to the certain number of times within a time period even though the TX UE has requested/triggered transmission of SL CSI report(s) or SL HARQ feedback report(s) to the RX UE, the TX UE may consider/determine as OOS and/or an RLF. For example, if the TX UE does not receive SL HARQ feedback report(s) from the RX UE more than or equal to the certain number of times within a time period even though the TX UE has requested/triggered transmission of SL CSI report(s) or SL HARQ feedback report(s) to the RX UE, the TX UE may consider/determine as OOS and/or an RLF. For example, the time period may be pre-configured for the TX UE and/or the RX UE.

For example, if a SL CSI value reported by the RX UE is lower than a pre-configured threshold, the TX UE may consider/determine as OOS and/or an RLF. For example, if SL CSI values reported by the RX UE is continuously lower than a pre-configured threshold by a pre-configured number of times, the TX UE may consider/determine as OOS and/or an RLF. In this case, a physical layer of the TX UE may report OOS and/or an RLF to a higher layer (e.g., MAC layer or RRC layer) of the TX UE. Herein, for example, the time period, a time interval related period, a slot offset, and/or a length may match at least one period, a slot offset and/or a length for which the physical layer of the TX UE reports IS/OOS status to the higher layer. Alternatively, for example, the time interval, the time interval related period, the slot offset, and/or the length may be determined by information exchanged between the TX UE and the RX UE through PC5 RRC signaling.

Additionally, based on an embodiment of the present disclosure, the TX UE needs to guarantee accuracy related to RLM operation(s) and/or RLF operation(s) of the RX UE. For example, the TX UE needs to guarantee accuracy related to RLM operation(s) and/or RLF operation(s) of the RX UE to be greater than or equal to a pre-configured threshold level. To this end, the TX UE may transmit PSCCH(s) and/or PSSCH(s) to the RX UE more than or equal to a threshold number/frequency within a pre-configured time period (hereinafter, T_RLM) based on the various embodiments described above. For example, the threshold number/frequency may be pre-configured for the TX UE and/or the RX UE. For example, T_RLM may be a measurement period in which the RX UE performs OOS, IS and/or RLF determination. For example, in the case the TX UE transmits PSCCH(s) and/or PSSCH(s) to the RX UE more than or equal to a threshold number/frequency within T_RLM, at least one of the information below may be defined to be exchanged/configured through pre-defined signaling between the TX UE and the RX UE. For example, the pre-defined signaling may include at least one of PC5 RRC signaling, MCE CE, and/or physical signaling. For example, the physical signaling may be a PSCCH and/or a PSSCH.

1) First information: parameter information related to T_RLM

For example, the parameter information related to T_RLM includes information related to the length of T_RLM, information related to a start time of T_RLM (e.g., slot offset information), and/or information related to an end time of T_RLM (e.g., slot offset information).

2) Second information: threshold information related to OOS declaration and/or threshold information related to IS declaration 3) Third information: threshold information for RLF declaration For example, the threshold information for RLF declaration includes at least one of a threshold related to the number of OOS occurrences, a threshold related to whether or not OOS occurs, a threshold related to the number of IS occurrences, a threshold related to whether or not IS occurs, a threshold related to duration, and/or a timer value For example, if the RX UE receives PSCCH(s) and/or PSSCH(s) from the TX UE less than a pre-configured threshold (e.g., 1) within T_RLM, the RX UE may determine/assume as OOS and/or an RLF. For example, in the case the TX UE transmits SCI to the RX UE at a certain frequency (within a pre-configured time) regardless of data traffic, the RX UE may determine/assume as OOS and/or an RLF if the RX UE receives PSCCH(s) and/or PSSCH(s) from the TX UE less than a pre-configured threshold (e.g., 1) within T_RLM. For example, if the RX UE receives PSSCH(s) and/or CSI-RS(s) from the TX UE less than a pre-configured threshold (e.g., 1) within T_RLM, the RX UE may determine/assume as OOS and/or an RLF. For example, in the case the TX UE transmits CSI-RS(s) to the RX UE at a certain frequency (within a pre-configured time) regardless of data traffic, the RX UE may determine/assume as OOS and/or an RLF if the RX UE receives PSSCH(s) and/or CSI-RS(s) from the TX UE less than a pre-configured threshold (e.g., 1) within T_RLM. For example, if the RX UE receives PSCCH(s) and/or PSSCH(s) related to (normal) packet/traffic transmission less than a pre-configured threshold (e.g., 1) within T_RLM from the TX UE, the RX UE may determine/assume as OOS and/or an RLF.

For example, if the TX UE does not transmit the SCI and/or the CSI-RS for a pre-determined time, the RX UE may determine as OOS and/or an RLF.

For example, if the RX UE succeeds in detection and/or decoding of CSI-RS(s) and/or SCI, and the corresponding quality is greater than or equal to a (pre-configured) threshold, the RX UE may consider/determine as IS. Otherwise, the RX UE may consider/determine as OOS. For example, if the corresponding quality is less than or equal to a (pre-configured) threshold, the RX UE may consider/determine as OOS. For example, if the RX UE fails to detect CSI-RS(s) and/or SCI, the RX UE may consider/determine as OOS. For example, if the RX UE fails to decode CSI-RS(s) and/or SCI, the RX UE may consider/determine as OOS. Herein, for example, if the TX UE transmits CSI-RS(s) in a PSSCH, and the RX UE successfully detects the PSSCH related to CSI-RS(s) and/or SCI related to the PSSCH, the RX UE may measure link quality based on CSI-RS(s). For example, the link quality measurement may include at least one of a link quality measurement related to SL RLM, a link quality measurement related to SL RLF, a link quality measurement related to SL OOS, and/or a link quality measurement related to SL IS.

For example, in the case the TX UE needs to perform/guarantee transmission of PSCCH(s) and/or PSSCH(s) more than or equal to a pre-configured threshold number/frequency within T_RLM based on various embodiments of the present disclosure, the number of transmissions of PSCCH(s) and/or PSSCH(s) used by the TX UE for (normal) packet/traffic transmission may be included in the counting of the pre-configured threshold number. For example, if the TX UE needs to transmit PSCCH(s) and/or PSSCH(s) more than or equal to 10 times within T_RLM, the TX UE should additionally transmit PSCCH(s) and/or PSSCH(s) 7 times or more within T_RLM if the TX UE has transmitted PSCCH(s) and/or PSSCH(s) 3 times for transmission of (normal) packet(s)/traffic(s) within T_RLM. For example, only when information related to a source ID and/or a destination ID exists in PSCCH(s) and/or PSSCH(s), the number of transmissions of PSCCH(s) and/or PSSCH(s) may be included in the counting of the pre-configured threshold number.

For example, in the case the TX UE needs to perform/guarantee transmission of PSCCH(s) and/or PSSCH(s) more than or equal to a pre-configured threshold number/frequency within T_RLM based on various embodiments of the present disclosure, the number of transmissions of PSCCH(s) and/or PSSCH(s) used by the TX UE for (normal) packet/traffic transmission may not be included in the counting of the pre-configured threshold number. For example, if the TX UE needs to transmit PSCCH(s) and/or PSSCH(s) more than or equal to 10 times within T_RLM, the TX UE should additionally transmit PSCCH(s) and/or PSSCH(s) 10 times or more within T_RLM even if the TX UE has transmitted PSCCH(s) and/or PSSCH(s) 3 times for transmission of (normal) packet(s)/traffic(s) within T_RLM.

For example, in the case the TX UE needs to perform/guarantee transmission of PSCCH(s) and/or PSSCH(s) more than or equal to a pre-configured threshold number/frequency within T_RLM based on various embodiments of the present disclosure, the number of transmissions of standalone PSCCH(s) in which the TX UE transmits to protect (specific) TB-related initial transmission and/or retransmission may be included in the counting of the pre-configured threshold number. For example, if the TX UE needs to transmit PSCCH(s) and/or PSSCH(s) more than or equal to 10 times within T_RLM, the TX UE should additionally transmit PSCCH(s) and/or PSSCH(s) 7 times or more within T_RLM if the TX UE has transmitted standalone PSCCH(s) 3 times to protect (specific) TB-related initial transmission and/or retransmission within T_RLM.

For example, in the case the TX UE needs to perform/guarantee transmission of PSCCH(s) and/or PSSCH(s) more than or equal to a pre-configured threshold number/frequency within T_RLM based on various embodiments of the present disclosure, the number of transmissions of standalone PSCCH(s) in which the TX UE transmits to protect (specific) TB-related initial transmission and/or retransmission may not be included in the counting of the pre-configured threshold number. For example, if the TX UE needs to transmit PSCCH(s) and/or PSSCH(s) more than or equal to 10 times within T_RLM, the TX UE should additionally transmit PSCCH(s) and/or PSSCH(s) 10 times or more within T_RLM even if the TX UE has transmitted standalone PSCCH(s) 3 times to protect (specific) TB-related initial transmission and/or retransmission within T_RLM. For example, if information related to a source ID and/or a destination ID does not exist in standalone PSCCH(s), the number of transmissions of standalone PSCCH(s) may not be included in the counting of the pre-configured threshold number.

For example, in the case the TX UE needs to perform/guarantee transmission of PSCCH(s) and/or PSSCH(s) more than or equal to a pre-configured threshold number/frequency within T_RLM based on various embodiments of the present disclosure, the number of transmissions of PSCCH(s) and PSSCH(s) transmitted by the TX UE to protect (specific) TB-related initial transmission and/or retransmission may be included in the counting of the pre-configured threshold number. For example, if the TX UE needs to transmit PSCCH(s) and/or PSSCH(s) more than or equal to 10 times within T_RLM, the TX UE should additionally transmit PSCCH(s) and/or PSSCH(s) 7 times or more within T_RLM if the TX UE has transmitted PSCCH(s) and PSSCH(s) 3 times to protect (specific) TB-related initial transmission and/or retransmission within T_RLM.

For example, in the case the TX UE needs to perform/guarantee transmission of PSCCH(s) and/or PSSCH(s) more than or equal to a pre-configured threshold number/frequency within T_RLM based on various embodiments of the present disclosure, the number of transmissions of PSCCH(s) and PSSCH(s) transmitted by the TX UE to protect (specific) TB-related initial transmission and/or retransmission may not be included in the counting of the pre-configured threshold number. For example, if the TX UE needs to transmit PSCCH(s) and/or PSSCH(s) more than or equal to 10 times within T_RLM, the TX UE should additionally transmit PSCCH(s) and/or PSSCH(s) 10 times or more within T_RLM even if the TX UE has transmitted PSCCH(s) and PSSCH(s) 3 times to protect (specific) TB-related initial transmission and/or retransmission within T_RLM. For example, if information related to a source ID and/or a destination ID does not exist in PSCCH(s) and PSCCH(s), the number of transmissions of PSCCH(s) and PSCCH(s) may not be included in the counting of the pre-configured threshold number.

In the above-described embodiment, the source ID may be a L1 source ID or a L2 source ID, and the destination ID may be a L1 destination ID or a L2 destination ID.

Based on an embodiment of the present disclosure, even if the RX UE does not receive packet(s), pre-configured channel(s) and/or pre-configured signal(s) (e.g., PSCCH, PSSCH, CSI-RS), and so on, (based on the above-described proposed method) from the TX UE, the RX UE may be configured so that a PHY layer of the RX UE reports and/or indicates OOS, IS, or a new pre-configured state indicator to an upper layer or a higher layer based on pre-configured periodicity. For example, a PHY layer of the RX UE may report and/or indicate OOS, IS or a new pre-configured state indicator to an upper layer or a higher layer based on pre-configured periodicity. Alternatively, even if the TX UE does not receive packet(s), pre-configured channel(s) and/or pre-configured signal(s) (e.g., SL HARQ feedback), and so on, (based on the above-described proposed method), the TX UE may be configured so that a PHY layer of the TX UE reports and/or indicates OOS, IS or a new pre-configured state indicator to an upper layer or a higher layer based on pre-configured periodicity. For example, a PHY layer of the TX UE may report and/or indicate OOS, IS or a new pre-configured state indicator to an upper layer or a higher layer based on pre-configured periodicity.

Based on an embodiment of the present disclosure, a 2-stage SCI scheme may be applied. For example, according to the 2-stage SCI scheme, the entire control information may be divided into a first SCI and a second SCI. In addition, the TX UE may transmit the first SCI through a PSCCH and piggyback the second SCI on a PSSCH.

For example, in the case of applying the 2-stage SCI scheme, if the TX UE successfully decodes the first SCI, the TX UE may consider/determine as IS. For example, in the case of applying the 2-stage SCI scheme, if the TX UE successfully decodes the first SCI by the pre-configured number of times, the TX UE may consider/determine as IS. For example, in the case of applying the 2-stage SCI scheme, if the TX UE successfully decodes the first SCI continuously by the pre-configured number of times, the TX UE may consider/determine as IS. For example, the TX UE may use/consider only the first SCI for RLM operation(s).

For example, in the case of applying the 2-stage SCI scheme, if the TX UE successfully decodes the second SCI, the TX UE may consider/determine as IS. For example, in the case of applying the 2-stage SCI scheme, if the TX UE successfully decodes the second SCI by the pre-configured number of times, the TX UE may consider/determine as IS. For example, in the case of applying the 2-stage SCI scheme, if the TX UE successfully decodes the second SCI continuously by the pre-configured number of times, the TX UE may consider/determine as IS. For example, the TX UE may use/consider only the second SCI for RLM operation(s).

For example, in the case of applying the 2-stage SCI scheme, if the TX UE successfully decodes the first SCI and the second SCI, the TX UE may consider/determine as IS. For example, in the case of applying the 2-stage SCI scheme, if the TX UE successfully decodes the first SCI and the second SCI by the pre-configured number of times, the TX UE may consider/determine as IS. For example, in the case of applying the 2-stage SCI scheme, if the TX UE successfully decodes the first SCI and the second SCI continuously by the pre-configured number of times, the TX UE may consider/determine as IS. For example, the TX UE may use/consider both the first SCI and the second SCI for RLM operation(s).

Based on various embodiments of the present disclosure, in SL communication, the RX UE may efficiently determine OOS and/or IS for the TX UE. In addition, the TX UE may efficiently determine OOS and/or IS for the RX UE.

Figure 15:
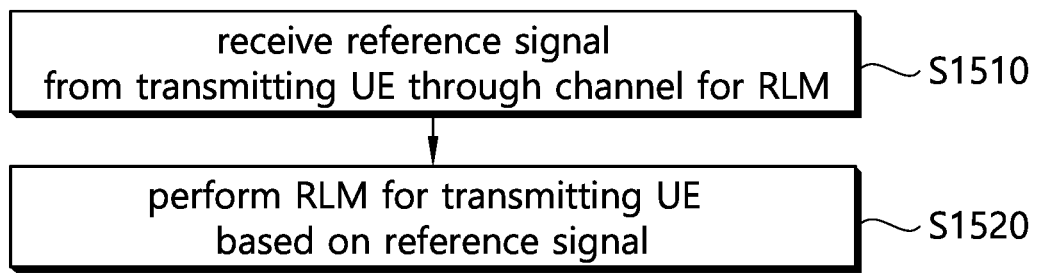
FIG. 15 shows a method for a receiving UE to perform RLM, based on an embodiment of the present disclosure.

FIG. 15 shows a method for a receiving UE to perform RLM, based on an embodiment of the present disclosure. The embodiment of FIG. 15 may be combined with various embodiments of the present disclosure.

Referring to FIG. 15, in step S1510, a receiving UE may receive reference signal(s) from a transmitting UE through channel(s) for RLM. In step S1520, the receiving UE may perform RLM for the transmitting UE based on the reference signal(s). In order for the receiving UE to perform RLM, various embodiments proposed above may be applied.

Figure 16:
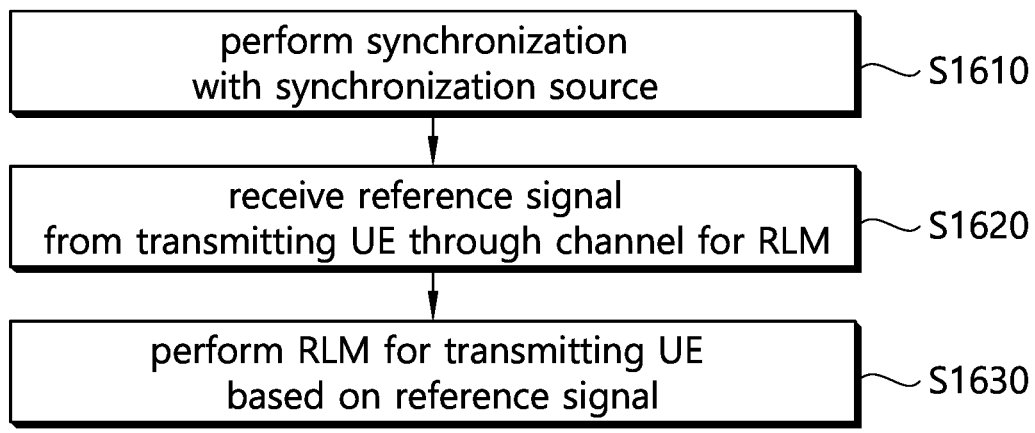
FIG. 16 shows a method for a receiving UE to perform RLM, based on an embodiment of the present disclosure.

FIG. 16 shows a method for a receiving UE to perform RLM, based on an embodiment of the present disclosure. The embodiment of FIG. 16 may be combined with various embodiments of the present disclosure.

Referring to FIG. 16, in step S1610, a receiving UE may perform synchronization with a synchronization source. In step S1620, the receiving UE may receive reference signal(s) from a transmitting UE through channel(s) for RLM. In step S1630, the receiving UE may perform RLM for the transmitting UE based on the reference signal(s). In order for the receiving UE to perform RLM, various embodiments proposed above may be applied.

Figure 17:
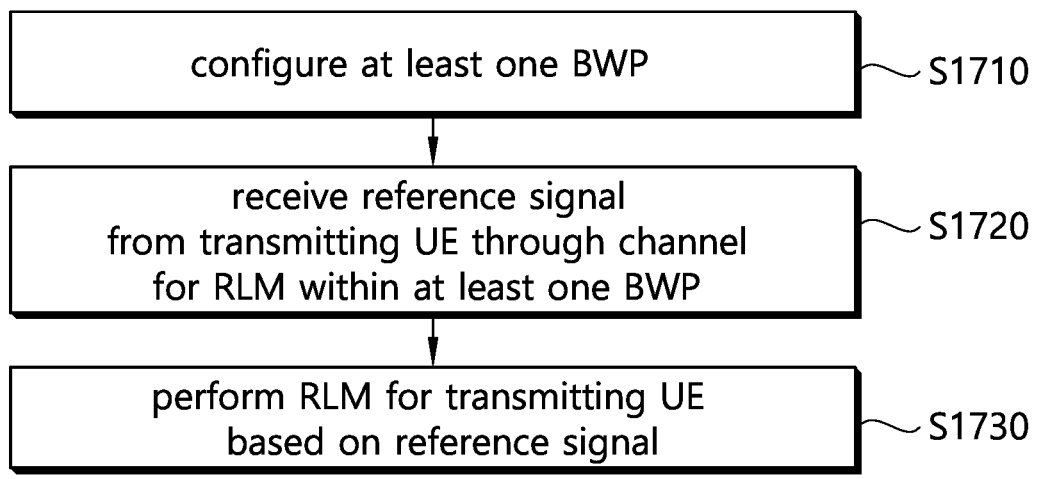
FIG. 17 shows a method for a receiving UE to perform RLM, based on an embodiment of the present disclosure.

FIG. 17 shows a method for a receiving UE to perform RLM, based on an embodiment of the present disclosure. The embodiment of FIG. 17 may be combined with various embodiments of the present disclosure.

Referring to FIG. 17, in step S1710, a receiving UE may configure at least one BWP. In step S1720, the receiving UE may receive reference signal(s) from a transmitting UE through channel(s) for RLM within at least one BWP. In step S1730, the receiving UE may perform RLM for the transmitting UE based on the reference signal(s). In order for the receiving UE to perform RLM, various embodiments proposed above may be applied.

Figure 18:
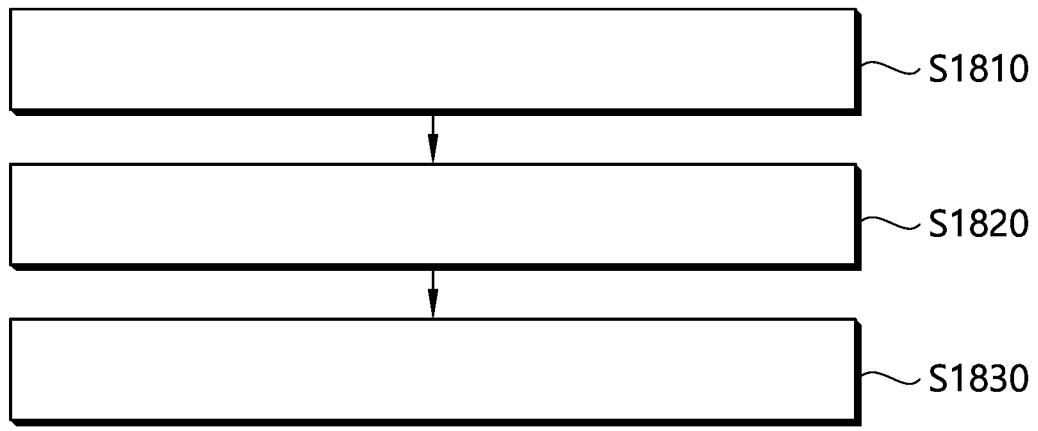
FIG. 18 shows a method for a first device to perform wireless communication, based on an embodiment of the present disclosure.

FIG. 18 shows a method for a first device to perform wireless communication, based on an embodiment of the present disclosure. The embodiment of FIG. 18 may be combined with various embodiments of the present disclosure.

Referring to FIG. 18, in step S1810, a first device may receive, from a second device, a plurality of reference signals or N sidelink control informations (SCIs) through N channels. Herein, N may be a positive integer.

In step S1820, the first device may determine a number of channels or a ratio of channels failed to receive, based on at least one of sequences of the plurality of reference signals or the N SCIs.

In step S1830, the first device may perform radio link monitoring (RLM) based on the number of channels or the ratio of channels failed to receive.

For example, the sequences of the plurality of reference signals may be different for each of the K channels transmitted by the second device. Herein, for example, K may be a positive integer greater than or equal to N.

For example, a SCI may include information representing a transmission order of a channel related to the SCI among the K channels transmitted by the second device. Herein, for example, K may be a positive integer greater than or equal to N.

For example, the plurality of reference signals or K SCIs may be transmitted by the second device through the K channels. Herein, for example, K may be a positive integer greater than or equal to N. For example, K may be greater than or equal to a minimum number of channels to be transmitted by the second device within a time period for the RLM. Additionally, for example, the first device may receive, from a base station or the second device, information related to the time period for the RLM.

For example, the channels may include at least one of a PSCCH or a PSSCH related to the PSCCH. For example, the PSSCH may include at least one of a CSI-RS or pre-configured dummy information. For example, a number of subchannels included in the PSSCH including the pre-configured dummy information may be pre-configured. For example, performing the RLM may include: determining, by the first device, to be an in-synch (IS) state based on successful decoding of a first SCI on the PSCCH and a second SCI on the PSSCH for a pre-configured number of times.

For example, performing the RLM may include: transferring, by a lower layer of the first device, information related to out-of-synch (OOS) to an upper layer of the first device, based on the number of channels or the ratio of channels failed to receive which exceeds a pre-configured threshold. For example, radio link failure (RLF) may be declared based on a number of the information related to OOS transferred to the upper layer which exceeds a pre-configured threshold.

Additionally, for example, before declaring radio link failure (RLF), the first device may transmit information representing that the RLF is expected to the second device, based on the number of channels or the ratio of channels failed to receive.

The proposed method can be applied to device(s) described below. First, the processor 102 of the first device 100 may control the transceiver 106 to receive, from a second device, a plurality of reference signals or N sidelink control informations (SCIs) through N channels. Herein, N may be a positive integer. In addition, the processor 102 of the first device 100 may determine a number of channels or a ratio of channels failed to receive, based on at least one of sequences of the plurality of reference signals or the N SCIs. In addition, the processor 102 of the first device 100 may perform radio link monitoring (RLM) based on the number of channels or the ratio of channels failed to receive.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: receive, from a second device, a plurality of reference signals or N sidelink control informations (SCIs) through N channels; determine a number of channels or a ratio of channels failed to receive, based on at least one of sequences of the plurality of reference signals or the N SCIs; and perform radio link monitoring (RLM) based on the number of channels or the ratio of channels failed to receive, wherein N may be a positive integer.

Based on an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: receive, from a second UE, a plurality of reference signals or N sidelink control informations (SCIs) through N channels; determine a number of channels or a ratio of channels failed to receive, based on at least one of sequences of the plurality of reference signals or the N SCIs; and perform radio link monitoring (RLM) based on the number of channels or the ratio of channels failed to receive, wherein N may be a positive integer.

Based on an embodiment of the present disclosure, a non-transitory computer-readable storage medium storing instructions may be provided. For example, the instructions, when executed, may cause a first device to: receive, from a second device, a plurality of reference signals or N sidelink control informations (SCIs) through N channels; determine a number of channels or a ratio of channels failed to receive, based on at least one of sequences of the plurality of reference signals or the N SCIs; and perform radio link monitoring (RLM) based on the number of channels or the ratio of channels failed to receive, wherein N may be a positive integer.

Figure 19:
FIG. 19 shows a method for a second device to perform wireless communication, based on an embodiment of the present disclosure.

FIG. 19 shows a method for a second device to perform wireless communication, based on an embodiment of the present disclosure. The embodiment of FIG. 19 may be combined with various embodiments of the present disclosure.

Referring to FIG. 19, in step S1910, a second device may transmit, to a first device, a plurality of reference signals or K sidelink control informations (SCIs) through K channels. For example, radio link monitoring (RLM) may be performed by the first device based on N channels among the K channels. For example, the N channels may be channels successfully received by the first device among the K channels. Herein, N may be a positive integer, and K may be a positive integer greater than or equal to N.

For example, sequences of the plurality of reference signals may be different for each of the K channels transmitted by the second device. For example, a SCI may include information representing a transmission order of a channel related to the SCI among the K channels transmitted by the second device.

The proposed method can be applied to device(s) described below. First, the processor 202 of the second device 200 may control the transceiver 206 to transmit, to a first device, a plurality of reference signals or K sidelink control informations (SCIs) through K channels.

Based on an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: transmit, to a first device, a plurality of reference signals or K sidelink control informations (SCIs) through K channels. For example, radio link monitoring (RLM) may be performed by the first device based on N channels among the K channels. For example, the N channels may be channels successfully received by the first device among the K channels. Herein, N may be a positive integer, and K may be a positive integer greater than or equal to N.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 20:
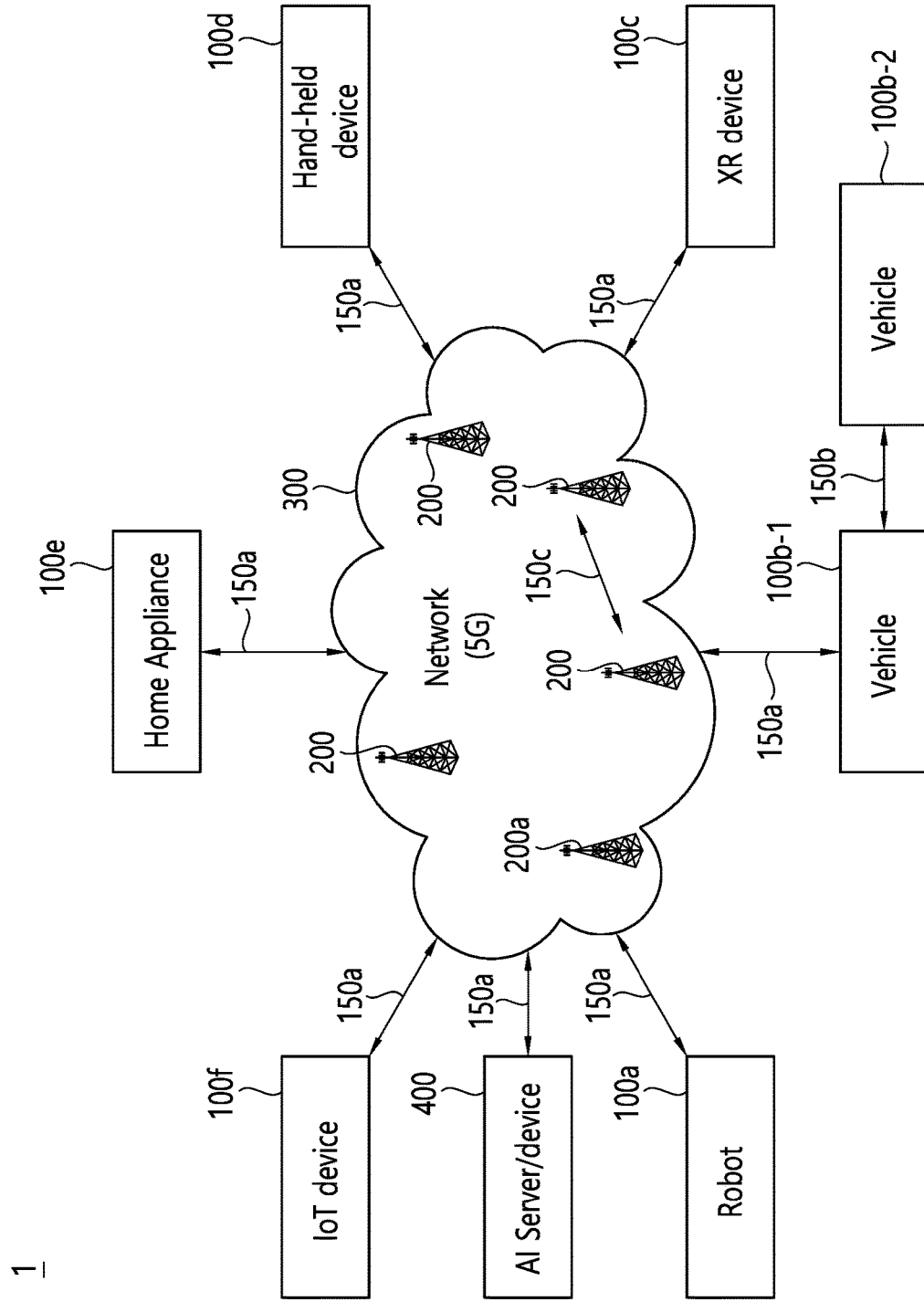
FIG. 20 shows a communication system 1, based on an embodiment of the present disclosure.

FIG. 20 shows a communication system 1, based on an embodiment of the present disclosure.

Referring to FIG. 20, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 21:
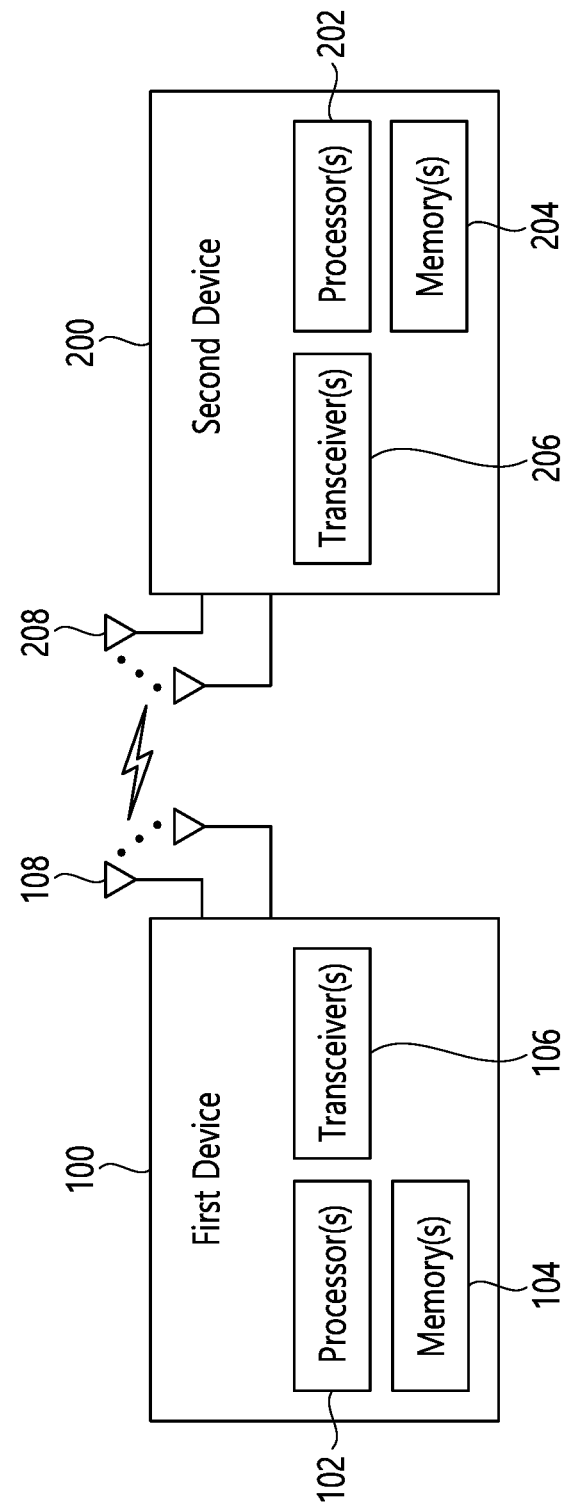
FIG. 21 shows wireless devices, based on an embodiment of the present disclosure.

FIG. 21 shows wireless devices, based on an embodiment of the present disclosure.

Referring to FIG. 21, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 22:
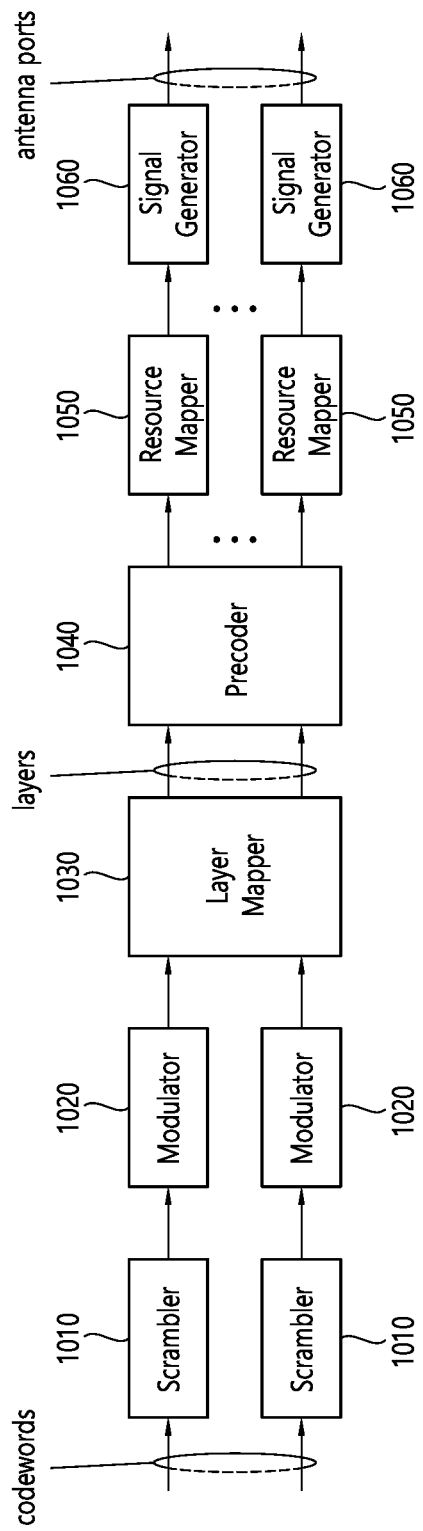
FIG. 22 shows a signal process circuit for a transmission signal, based on an embodiment of the present disclosure.

FIG. 22 shows a signal process circuit for a transmission signal, based on an embodiment of the present disclosure.

Referring to FIG. 22, a signal processing circuit 1000 may include scramblers 1010, modulators 1020, a layer mapper 1030, a precoder 1040, resource mappers 1050, and signal generators 1060. An operation/function of FIG. 22 may be performed, without being limited to, the processors 102 and 202 and/or the transceivers 106 and 206 of FIG. 21. Hardware elements of FIG. 22 may be implemented by the processors 102 and 202 and/or the transceivers 106 and 206 of FIG. 21. For example, blocks 1010 to 1060 may be implemented by the processors 102 and 202 of FIG. 21. Alternatively, the blocks 1010 to 1050 may be implemented by the processors 102 and 202 of FIG. 21 and the block 1060 may be implemented by the transceivers 106 and 206 of FIG. 21.

Codewords may be converted into radio signals via the signal processing circuit 1000 of FIG. 22. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 22. For example, the wireless devices (e.g., 100 and 200 of FIG. 21) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 23:
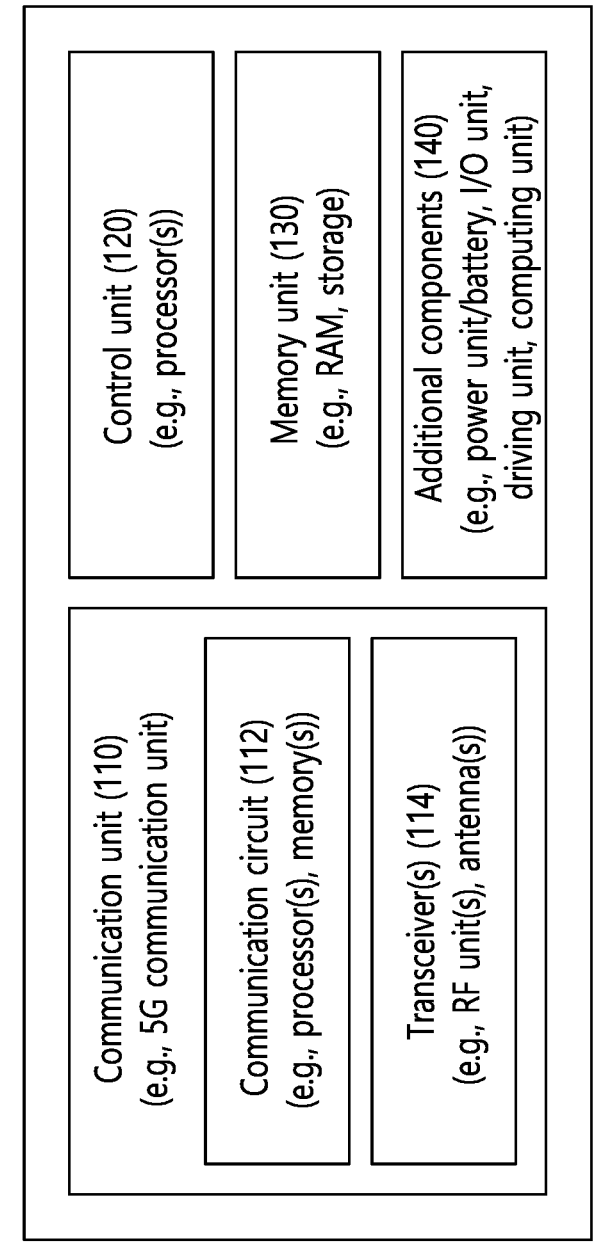
FIG. 23 shows another example of a wireless device, based on an embodiment of the present disclosure.

FIG. 23 shows another example of a wireless device, based on an embodiment of the present disclosure. The wireless device may be implemented in various forms according to a use-case/service (refer to FIG. 20).

Referring to FIG. 23, wireless devices 100 and 200 may correspond to the wireless devices 100 and 200 of FIG. 21 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 21. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 20), the vehicles (100b-1 and 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, etc. The wireless device may be used in a mobile or fixed place according to a use-example/service.

In FIG. 23, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 23 will be described in detail with reference to the drawings.

Figure 24:
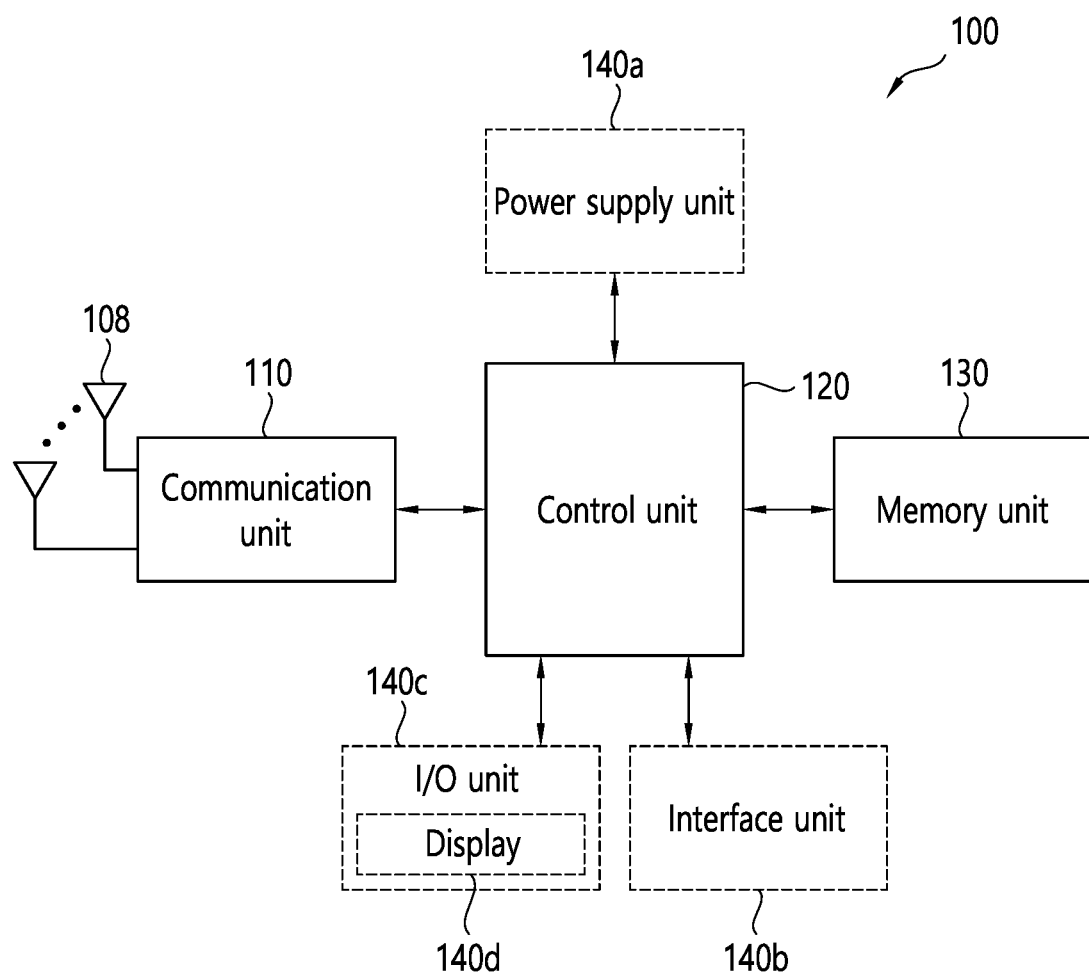
FIG. 24 shows a hand-held device, based on an embodiment of the present disclosure.

FIG. 24 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 24, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 23, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 25 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 25, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 23, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device in a wireless communication system, the method comprising:
    obtaining information related to a threshold number for radio link failure (RLF) detection;
    transmitting, to a second device, first sidelink control information (SCI) on a physical sidelink control channel (PSCCH), for scheduling a physical sidelink shared channel (PSSCH) and second SCI on the PSSCH;
    transmitting, to the second device, the second SCI on the PSSCH;
    incrementing a number for the RLF detection by 1 based on that a hybrid automatic repeat request (HARQ) feedback for the PSSCH is absent; and
    detecting RLF based on that the number for the RLF detection reaches the threshold number for the RLF detection.

2. The method of claim 1, wherein the PSSCH includes at least one of a CSI-RS or pre-configured dummy information.

3. The method of claim 1, wherein the threshold number for the RLF detection is obtained based on receiving the threshold number for the RLF detection from the base station.

4. The method of claim 1, wherein the threshold number for the RLF detection is obtained based on pre-configuration by the first device.

5. The method of claim 1, wherein the RLF detection is for a unicast transmission.

6. The method of claim 1, wherein the RLF detection is indicated to radio resource control (RRC).

7. The method of claim 1, wherein the RLF detection is hybrid automatic repeat request (HARQ)-based RLF detection.

8. The method of claim 1, wherein the RLF detection is for a PC5-RRC connection.

9. The method of claim 8, wherein the PC5-RRC connection is established by upper layers.

10. The method of claim 8, wherein the number for the RLF detection is maintained for the PC5-RRC connection.

11. The method of claim 8, wherein, based upon establishment of the PC5-RRC connection, the number for the RLF detection is initialized to zero.

12. The method of claim 8, wherein, based upon establishment of the PC5-RRC connection, the number for the RLF detection is re-initialized to zero.

13. The method of claim 8, wherein, based upon configuration or reconfiguration of the threshold number for the RLF detection, the number for the RLF detection is initialized to zero.

14. The method of claim 8, wherein, based upon configuration or reconfiguration of the threshold number for the RLF detection, the number for the RLF detection is re-initialized to zero.

15. The method of claim 8, wherein, based on the HARQ feedback for the PSSCH is present, the number for the RLF detection is re-initialized to zero.

16. The method of claim 1, wherein the RLF detection is a sidelink RLF detection.

17. The method of claim 1, wherein the number for the RLF detection is a number of consecutive discontinuous transmission (DTX).

18. A first device adapted to perform wireless communication, the first device comprising:
    at least one transceiver;
    at least one processor; and
    at least one memory connected to the at least one processor and storing instructions that, based on being executed, cause the first device to perform operations comprising:
    obtaining information related to a threshold number for radio link failure (RLF) detection;
    transmitting, to a second device, first sidelink control information (SCI) on a physical sidelink control channel (PSCCH), for scheduling a physical sidelink shared channel (PSSCH) and second SCI on the PSSCH;
    transmitting, to the second device, the second SCI on the PSSCH;
    incrementing a number for the RLF detection by 1 based on that a hybrid automatic repeat request (HARQ) feedback for the PSSCH is absent; and
    detecting RLF based on that the number for the RLF detection reaches the threshold number for the RLF detection.

19. A processing device adapted to control a first device, the first device comprising:
    at least one processor; and
    at least one memory connected to the at least one processor and storing instructions that, based on being executed, cause the first device to perform operations comprising:
    obtaining information related to a threshold number for radio link failure (RLF) detection;
    transmitting, to a second device, first sidelink control information (SCI) on a physical sidelink control channel (PSCCH), for scheduling a physical sidelink shared channel (PSSCH) and second SCI on the PSSCH;

transmitting, to the second device, the second SCI on the PSSCH;

incrementing a number for the RLF detection by 1 based on that a hybrid automatic repeat request (HARQ) feedback for the PSSCH is absent; and detecting RLF based on that the number for the RLF detection reaches the threshold number for the RLF detection.

* * * * *